(12) United States Patent
Ide

(10) Patent No.: US 6,915,055 B2
(45) Date of Patent: Jul. 5, 2005

(54) OPTICAL WAVEGUIDE, FABRICATION METHOD THEREFOR AND OPTICAL WAVEGUIDE DEVICE

(75) Inventor: Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/778,093

(22) Filed: Feb. 17, 2004

(65) Prior Publication Data

US 2004/0190848 A1 Sep. 30, 2004

(30) Foreign Application Priority Data

Mar. 28, 2003 (JP) ........................................ 2003-091834

(51) Int. Cl.⁷ ................................................. G02B 6/10
(52) U.S. Cl. ........................................ 385/130; 385/132
(58) Field of Search ................................. 385/129–132

(56) References Cited

U.S. PATENT DOCUMENTS 6,529,667 B2 * 3/2003 Nashimoto .................. 385/129

FOREIGN PATENT DOCUMENTS

| JP | 63-124006 | 5/1988 |
| JP | 5-100123 | 4/1993 |
| JP | 5-127032 | 5/1993 |
| JP | 5-157925 | 6/1993 |
| JP | 8-179144 | 7/1996 |
| JP | 2001-51143 | 2/2001 |
| JP | 2001-183538 | 7/2001 |

* cited by examiner

Primary Examiner—Frank G. Font
Assistant Examiner—Michael P. Mooney
(74) Attorney, Agent, or Firm—Staas & Halsey LLP

(57) ABSTRACT

An optical waveguide, a fabrication method therefor and an optical waveguide device are disclosed wherein a sink of a core layer (waveguide core) can be suppressed while formation of cracks and air bubbles is suppressed. The optical waveguide comprises a substrate, and a lower clad layer, a core layer and an upper clad layer formed on the substrate such that the core layer is buried within the upper and lower clad layers. The lower clad layer is formed from a silica glass-type material, which is formed using a trialkylsilyl-type compound as an organic source, such that the melting temperature thereof is higher by a predetermined temperature or more than that of the upper clad layer.

16 Claims, 14 Drawing Sheets

SiOB SOURCE

TEB SOURCE

OPTICAL WAVEGUIDE, FABRICATION METHOD THEREFOR AND OPTICAL WAVEGUIDE DEVICE

BACKGROUND OF THE INVENTION

1) Field of the Invention

The present invention relates to an optical waveguide, a fabrication method therefor and an optical waveguide device to be applied to various optical transmission systems, such as, for example, a wavelength division multiplexing (WDM) optical transmission system in the field of optical communication.

2) Description of the Related Art

In recent years, construction of a wavelength division multiplexing (WDM) optical communication network (WDM optical transmission system) is proceeding in order to implement a photonic network which can cope with an explosive increase of the data traffic caused by popularization of the Internet and so forth.

In the WDM optical transmission system, in order to reduce the cost, it is effective to apply a technique of a planar lightwave circuit (PLC) which can integrate functions of several optical devices and electronic devices using an optical waveguide to integrate various functions. Further, it is demanded to easily implement minimization and high integration of a PLC device wherein such various functions are integrated.

Here, a silica glass-type buried optical waveguide used in the WDM optical transmission system is described with reference to FIG. 18.

As shown in FIG. 18, the silica glass-type buried optical waveguide includes a lower clad layer 111, an upper clad layer 113 and a core layer 112 encircled by the lower and upper clad layers 111 and 113, all formed on an Si substrate 110.

Such a silica glass-type buried optical waveguide as just described is fabricated in the following manner.

First, silica glass (hereinafter described more particularly) which is a material for the lower clad layer 111 and the core layer 112 is deposited in order, and annealing process is performed to convert the silica glass into transparent glass to form the lower clad layer 111 and the core layer 112 in order on the Si substrate 110.

Then, a mask pattern is formed, for example, by photolithography, and thereafter, dry etching according to the reactive ion etching (RIE) method is performed to remove unnecessary part of the core layer 112 to form a striped core layer (waveguide core) 112 having a desired pattern (waveguide pattern).

Then, silica glass (hereinafter described more particularly) which is a material for the upper clad layer 113 is deposited on the lower clad layer 111 and the core layer 112, and annealing process is performed to convert the silica glass into transparent glass to produce an buried optical waveguide wherein the core layer 112 is encircled by and buried within the lower clad layer 111 and the upper clad layer 113.

Here, in order to reduce the difference between the thermal expansion coefficient of the clad layers 111 and 113 and the thermal expansion coefficient of the Si substrate 110 to suppress birefringence arising from the thermal stress, usually the clad layers 111 and 113 are formed typically using BPSG (borophospho-silicate glass) as a material.

Further, a BPSG film which forms the clad layers 111 and 113 is formed using at least one or more of, for example, tetraethoxysilane (TEOS; $Si(OC_2H_5)_4$), tetramethoxysilane (TMOS; $Si(OCH_3)_4$), triethylphosphate (TEOP; $PO(OC_2H_5)_3$), trimethylphosphate (TMOP; $PO(OCH_3)_3$), triethylborate (TEB; $B(OC_2H_5)_3$) and trimethylborate (TMB; $B(OCH_3)_3$) in combination as an organic source and forming a film of the material having a thickness ranging, for example, from 15 μm to 20 μm. For example, the triethylborate (TEB) is a compound having such a structure as shown in FIG. 19.

Further, it is common to use a material having a refractive index higher than that of the borophospho silicate glass (BPSG) used as a material for the clad layers 111 and 113, such as, for example, a GPSG (germanophospho silicate glass) for the core layer 112.

The GPSG film which forms the core layer 112 is formed using at least one or more of, for example, TEOS, TMOS, TEOP, TMOP, tetraethoxygermanium (TEG; $Ge(OC_2H_5)_4$) and tetramethoxygermanium (TMG; $Ge(OCH_3)_4$) in combination as an organic source and forming a film having a thickness of, for example, 10 μm or less.

The material used as an organic source for forming the clad layers 111 and 113 and core layer 112 of such a general optical waveguide is generically called alkoxy-type compound.

It is to be noted that a technique regarding an buried optical waveguide is disclosed, for example, in Japanese Patent Laid-Open No. 63-124006, No. 5-157925, No. 5-100123, No. 5-127032, No. 8-179144, No. 2001-51143 and No. 2001-183538.

Incidentally, in a buried optical waveguide used for a WDM optical transmission system, various functions must be integrated. Therefore, since the striped core layer 112 has a fine pattern (core pattern) formed by means of dry etching according to the RIE method as described above, a fine groove D appears between striped core layers 112 adjacent to each other.

Therefore, when the upper clad layer 113 is formed, silica glass (for example, BPSG) used as a material for the upper clad layer 113 is deposited such that the fine groove D is buried within the upper clad layer 113 without a void (burying failure), and thereafter, annealing process is performed for the silica glass so as to reflow. Consequently, the silica glass (for example, BPSG) used as a material for the upper clad layer 113 is filled in the groove D.

However, if the lower clad layer 111 is formed using an alkoxy-type compound as an organic source as described above, then the lower clad layer 111 is softened upon reflow. As a result, the core layer (waveguide core) 112 formed on the lower clad layer 111 may sink as seen in FIG. 18.

FIG. 20 is a composition chart illustrating relationships of cracks and air bubbles to compositions (wt %) of boron (B) and phosphorus (P) where the clad layers (BPSG films) are formed on the Si substrate (silicon substrate) using an alkoxy-type compound as an organic source.

In FIG. 20, each region of slanting lines indicates a film formation defect appearing composition region wherein cracks or air bubbles (film formation defects) are liable to be formed, and the other region indicates a free composition region wherein cracks or air bubbles are nor formed.

When the compositions (wt %) of boron (B) and phosphorus (P) included in a clad layer (for which an alkoxy-type compound is used) is determined, they must be determined such that cracks or air bubbles are not formed. However, since the free composition region is small as seen in FIG. 20, the determination is constrained in this regard.

Further, where a clad layer is formed on a Si substrate, if there is a difference between the coefficients of thermal expansion of the Si substrate and the clad layer, then stress (internal stress) occurs in the clad layer.

Here, in FIG. 20, a broken line indicates an equal stress line where the stress is zero (stress=0). For example, if the composition is adjusted such that the sum of the B composition and the P composition is approximately 11 wt % (B composition+P composition=11 wt %), then the stress is zero (stress=0). It is to be noted that, in accordance with the magnitude of the stress, the equal stress lines for different stresses can be represented as parallel lines to the equal stress line where the stress is zero.

In FIG. 20, on the left side (lower side) of the broken line, the stress is inclined to increase in a compression direction in accordance with a decrease of the boron composition (B composition) and the phosphorus composition (P composition) (conversely speaking, the stress is inclined to decrease in a compression direction in accordance with an increase of the B composition and the P composition). Meanwhile, on the right side (upper side) of the broken line, the stress is inclined to increase in a tension direction in accordance with an increase of the boron composition (B composition) and the phosphorus composition (P composition) (conversely speaking, the stress is inclined to decrease in the tension direction in accordance with a decrease of the B composition and P composition). In short, in FIG. 20, the stress is lowest on the equal stress line indicated by the broken line, but the stress increases as the distance from the equal stress line increases.

Here, that the stress is zero signifies that the thermal expansion coefficient of the clad layer and the thermal expansion coefficient of the Si substrate are equal to each other (the difference in thermal expansion coefficient is zero: thermal expansion coefficient difference=0). Therefore, where the stress is zero, the equal stress line can be regarded as an equal thermal expansion coefficient line.

In FIG. 20, on the left side (lower side) of the broken line, the thermal expansion coefficient is inclined to decrease in accordance with a decrease of the boron composition (B composition) and the phosphorus composition (P composition), but on the right side (upper side) of the broken line, the thermal expansion coefficient is inclined to increase in accordance with an increase of the boron composition (B composition) and the phosphorus composition (P composition). Therefore, in FIG. 20, on the left side (lower side) of the broken line, the difference of the coefficient in thermal expansion ($d_{clad}-d_{Si}$) between the Si substrate and the clad layer is inclined to increase in accordance with a decrease of the B composition and the P composition (that is, a negative value increases), but on the right side (upper side) of the broken line, the difference in thermal expansion coefficient ($d_{clad}-d_{Si}$) between the Si substrate and the clad layer is inclined to increase in accordance with an increase of the boron composition (B composition) and the phosphorus composition (P composition) (that is, a positive value increases). In short, the thermal expansion coefficient of the clad layer is nearest (equal) to that of the Si substrate 110 on the equal thermal expansion coefficient line indicated by the broken line in FIG. 20, but the difference between the coefficient of the Si substrate 110 and the coefficient of the clad layer increases as the distance from the equal thermal expansion coefficient line increases.

Further, as seen in FIG. 20, the P composition has a dominant influence on the refractive index. In particular, the refractive index increases as the proportion of the P composition increases [that is, the proportion of the P composition (wt %) in the BPSG composition increases], but the refractive index decreases as the proportion of the P composition decreases [that is, the proportion of the P composition (wt %) in the BPSG composition decreases]. It is to be noted that, in FIG. 20, a long dashed short dashed line indicates an equal refractive index line of a refractive index equal to a target refractive index for the upper clad layer 113.

Since the stress of the upper clad layer 113 which covers the side face of the core layer 112 has a dominant influence on the birefringence of the core layer 112, the composition of the upper clad layer 113 is preferably selected such that the stress thereof is zero (stress=0) (the difference between the thermal expansion coefficient of the Si substrate 110 and the thermal expansion coefficient of the upper clad layer 113 is zero; linear expansion coefficient difference=0).

Therefore, generally the composition of the upper clad layer 113 is determined such that the P composition is adjusted so that the upper clad layer 113 has a desired target refractive index and the stress is zero (stress=0). In particular, for example, the composition of the upper clad layer 113 is determined such that it is equal to a proportion (wt %) of the B composition and the P composition at a point at which the equal refractive index line indicated by the long dashed short dashed line in FIG. 20 and the equal stress line indicated by the broken line in FIG. 20 where the stress is zero cross each other.

Meanwhile, the composition of the lower clad layer 111 is usually determined such that it has a substantially equal P composition to that of the upper clad layer 113 so that the refractive index of the lower clad layer 111 is equal to the refractive index of the upper clad layer 113. In short, the composition of the lower clad layer 111 is determined such that it falls, for example, on the equal stress line indicated by the long dashed short dashed line in FIG. 20.

In this instance, if the difference in proportion (wt %) of the B composition between the lower clad layer 111 and the upper clad layer 113 is decreased (if the difference of the B composition is insufficient) so that the B composition and the P composition of the lower clad layer 111 may fall in the free composition region (region other than the regions of slanting lines in FIG. 20) as seen in FIG. 20 in order that cracks or air bubbles may not be formed, then a sink of the core layer 112 appears because the melting point of the BPSG depends much upon the B composition. On the other hand, if a sufficient difference of the B composition is assured so that no sink of the core layer 102 may appear, then cracks will be formed.

In this manner, it is difficult to determine the composition (B composition and P composition) of the lower clad layer 111 so that a sink may not appear in the core layer 112 while preventing formation of cracks or air bubbles.

SUMMARY OF THE INVENTION

It is an object of the present invention to provide an optical waveguide, a fabrication method therefore and an optical waveguide device by which a sink of a core layer (waveguide core) can be suppressed while formation of cracks and air bubbles is suppressed.

In order to attain the object described above, according to an aspect of the present invention, there is provided an optical waveguide, comprising a substrate, and a lower clad layer, a core layer and an upper clad layer formed on the substrate such that the core layer is buried within the upper and lower clad layers, the lower clad layer (the entire lower clad layer or at least a portion of the lower clad layer at which the lower clad layer contacts with the core layer) being formed from a silica glass-type material, which is formed using a trialkylsilyl-type compound as an organic source, such that the melting temperature thereof is higher by a predetermined temperature or more than that of the upper clad layer (the entire upper clad layer or at least a portion of the upper clad layer in the proximity of the core layer).

Preferably, the lower clad layer includes a first lower clad layer which contacts with the substrate and a second lower clad layer which contacts with the core layer, and the first lower clad layer has a thermal expansion coefficient substantially equal to that of the substrate while the second lower clad layer is formed from a silica glass-type material, which is formed using a trialkylsilyl-type compound as an organic source, such that the melting temperature thereof is higher by a predetermined temperature or more than that of the upper clad layer.

Preferably, the trialkylsilyl-type compound includes at least one of Si—O—B bond, Si—O—Ge bond, Si—O—P bond, Si—O—Ti bond, and Si—O—Ta bond.

Preferably, the upper clad layer has a thermal expansion coefficient substantially equal to that of the substrate.

Preferably, the upper clad layer includes a first upper clad layer which contacts with the core layer and a second clad layer formed on the first upper clad layer, and the first upper clad layer has a thermal expansion coefficient substantially equal to that of the substrate while the second upper clad layer has a thermal expansion coefficient higher than that of the substrate.

Preferably, the core layer has a thermal expansion coefficient substantially equal to that of the substrate.

According to another aspect of the present invention, there is provided an optical waveguide device formed using the optical waveguide described above, comprising a thin film heater provided on the upper clad layer along the core layer, and a heat insulation groove for increasing the heat resistance of the core layer.

According to a further aspect of the present invention, there is provided a fabrication method for an optical waveguide formed on a substrate such that a core layer is buried between an upper clad layer and a lower clad layer, comprising a lower clad layer forming step of forming the lower clad layer from a silica glass-type material, which is formed using a trialkylsilyl-type compound as an organic source, on the substrate such that the melting temperature thereof is higher by a predetermined temperature or more than that of the upper clad layer, a core layer forming step of forming the core layer on the lower clad layer, a waveguide core forming step of forming a waveguide core having a desired pattern by patterning the core layer, and an upper clad layer forming step of forming the upper clad layer so as to bury the waveguide core formed on the lower clad layer.

Preferably, the lower clad layer forming step includes the steps of forming a first lower clad layer having a thermal expansion coefficient substantially equal to that of the substrate on the substrate, and forming a second lower clad layer from a silica glass-type material, which is formed using a trialkylsilyl-type compound as an organic source, on the first lower clad layer such that the melting temperature thereof is higher by a predetermined temperature or more than that of the upper clad layer.

Meanwhile, preferably the upper clad layer forming step includes the steps of forming a first upper clad layer having a thermal expansion coefficient substantially equal to that of the substrate such so as to surround the waveguide core formed on the lower clad layer, and forming a second upper clad layer having a thermal expansion coefficient higher than that of the substrate on the first upper clad layer.

With the optical waveguide, fabrication method therefore and optical waveguide device, there is an advantage that a sink of a core layer (waveguide core) can be suppressed while formation of cracks and air bubbles is suppressed.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

In the following, several embodiments of the present invention are described with reference to the drawings.
First Embodiment First, an optical waveguide and a fabrication method therefore according to a first embodiment of the present invention are described with reference to FIGS. 1 to 3 and 21.

Figure 1:
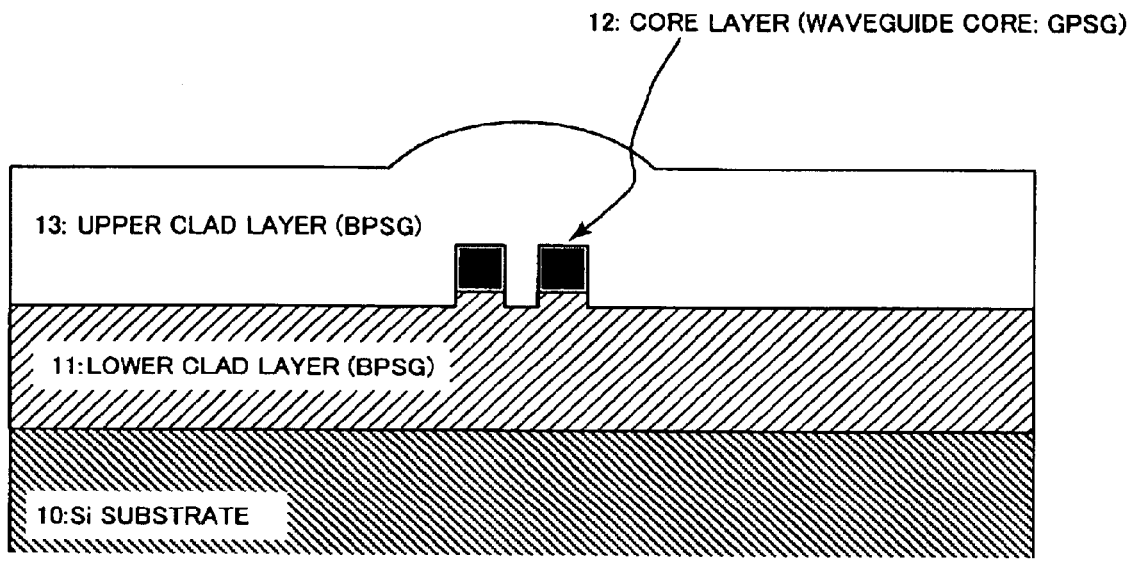
FIG. 1 is a schematic sectional view showing a general configuration of an optical waveguide according to a first embodiment of the present invention.

Referring first to FIG. 1, the present optical waveguide includes a core layer 12 encircled by clad layers 11 and 13 formed on a substrate 10. In particular, the optical waveguide is formed as an buried optical waveguide (such as, for example, an buried optical waveguide of the quartz-type or an optical waveguide of the silica glass-type) wherein the core layer 12 of a striped shape is buried within or between the clad layers 11 and 13.

The substrate 10 is formed using, for example, a silicon substrate (Si substrate), a silica-glass substrate or the like.

The clad layers include a lower clad layer 11 formed on the substrate 10 and an upper clad layer 13 formed on the lower clad layer 11 such that the striped core layer (waveguide core) 12 patterned in a desired shape is encircled by the clad layers 11 and 13.

The clad layers 11 and 13 are formed, for example, from BPSG (borophospho silicate glass) in order to reduce the difference in thermal expansion coefficient (coefficient of linear expansion) from the substrate 10 and decrease the birefringence by the thermal stress. In the present embodiment, a trialkylsilyl-type (group) compound is used as an organic source for forming the clad layers 11 and 13 as BPSG films. It is to be noted that particulars of the trialkylsilyl-type compound to be used as an organic source are hereinafter described.

The core layer 12 has a refractive index with which a required refractive index difference required for waveguiding of light and is formed so as to have a desired pattern (core pattern, waveguide pattern). For the core layer 12, a material having a higher refractive index than that of the clad layers 11 and 13 such as, for example, a GPSG material (germanophospho silicate glass; silica glass-type material) is used.

In the present embodiment, an alkoxy-type (group) compound is used as an organic source for forming the core layer 12 as a GPSG film. For example, an alkoxy-type compound composed of a combination of at least one or more of TEOS, TMOS, TEOP, TMOP, TEG and TMG are used as an organic source for forming the core layer 12.

In the following, a trialkylsilyl-type compound to be used as an organic source for the clad layers 11 and 13 is described particularly.

First, a reason why a trialkylsilyl-type compound is used in place of an alkoxy-type compound which is used popularly as an organic source for a clad layer.

Figure 21:
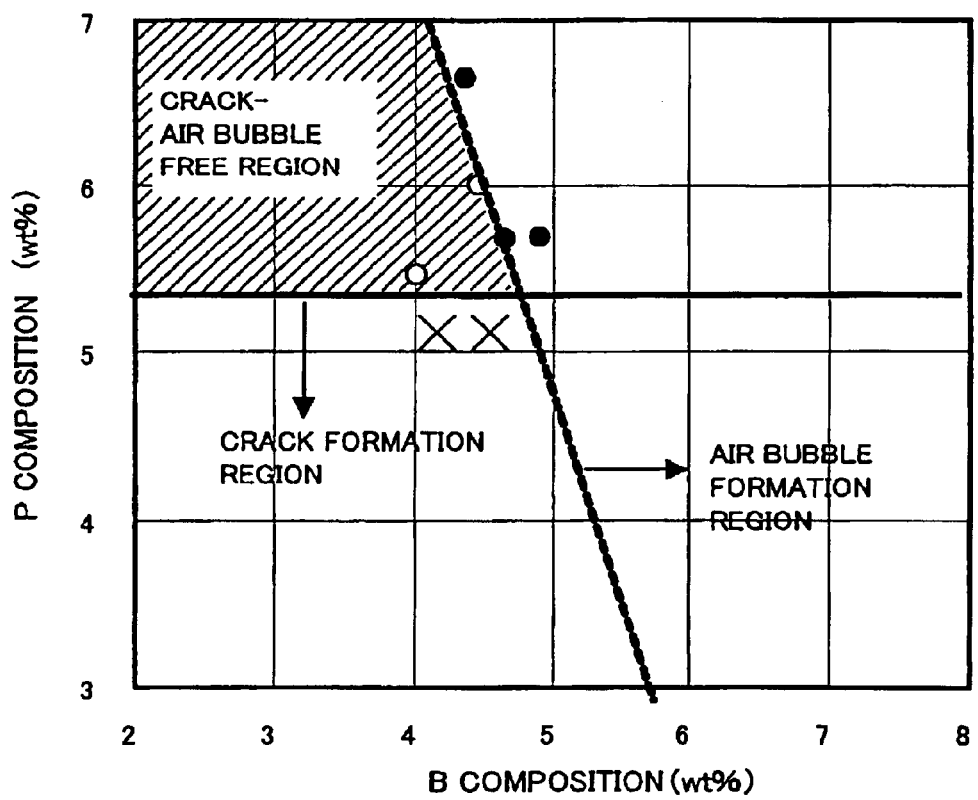
FIG. 21 is a composition chart illustrating crack and air bubble formation regions with respect to compositions of boron and phosphorus where an alkoxy-type compound is used as an organic source to form a clad (BPSG film) on a common optical waveguide.

FIG. 21 is a composition chart which illustrates a relationship of cracks and air bubbles to the compositions (wt %) of boron (B) and phosphorus (P) where a clad layer is formed by an atmospheric pressure CVD method using an alkoxy-type compound as an organic source (here, an organic source formed from a combination of TEOS, TMOP and TEB).

It is to be noted here that FIG. 21 illustrates a result of measurement when a clad layer of a film thickness of 20 μm is formed at a film formation temperature of 450° C. on a silicon substrate having a thickness of 1 mm and a diameter of 6 inches and annealing process (heat treatment) is performed at 880° C. after the film formation.

As seen from FIG. 21, cracks are formed where the composition of phosphorus (P) has a value lower than a straight line indicated as a solid line (that is, a value in the region on the lower side of the straight line), but air bubbles are formed where the composition of boron (B) has a value higher than another straight line indicated as a broken line (that is, a value in the region on the right side of the broken line). In other words, the free composition region in which cracks or air bubbles (film formation defects) do not appear is limited to the region indicated by slanting lines in FIG. 21, but the other regions form film formation defect appearance composition regions within which cracks or air bubbles are liable to appear. Consequently, it can be seen that there is a restriction to the settings of the concentrations of boron (B) and phosphorus (P) to be contained in the clad layer.

In this instance, since the refractive index of the clad layer depends upon the concentration settings of boron (B) and phosphorus (P), in order to implement an optical waveguide having a high degree of freedom in design, it is desired to increase the composition selection range as great as possible. Further, as regards the refractive index of the optical waveguide, the demand for reduction of the dispersion (variations) in refractive index in optical waveguide devices such as, for example, directional couplers is increasing. Also it is demanded to reduce the polarization mode dispersion (PMD) and the polarization dependent loss (PDL), which are caused by an internal stress and so forth which act on the optical waveguide, to improve the characteristic (polarization characteristic) of the optical waveguide.

However, a popular organic source for which an alkoxy-type compound is used requires doping of the element of boron (B) during film formation and is therefore influenced significantly by the heat upon film formation. Further, since ununiform doping causes the composition to vary within a plane of a wafer or between a plurality of wafers, there is a limitation to reduction of the dispersion in refractive index.

Further, it is known that, in order to reduce the polarization mode dispersion (PMD) and the polarization dependent loss (PDL) to improve the polarization characteristic of the optical waveguide, the B composition of an alkoxy-type compound used as an organic source to form the clad layer should be increased. However, if the B composition is increased, then since the clad layer has a great thickness, cracks become likely to appear and also such a bad influence appears that air bubbles are formed by the annealing process (for example, to a temperature higher than or equal to 800° C.) after the film formation. Such formation of cracks or air bubbles is not preferable because it makes a factor of the optical loss of the optical waveguide and so forth.

Further, since cracks are likely to appear because the clad layer has a great thickness, it is a possible idea to use divisional film formation wherein a plurality of clad layers of a small thickness are formed successively. This, however, is not preferable because it increases the number of steps.

Therefore, in the optical waveguide of the present embodiment, a trialkylsilyl-type compound is used as an organic source for the formation of the clad layers 11 and 13.

Where a trialkylsilyl-type compound is used as an organic source for the clad layers 11 and 13 in this manner, the influence of the heat upon film formation is reduced, and therefore, the variation in composition of the clad layers 11 and 13 is suppressed and therefore an optical waveguide of a high quality with regard to which the dispersion in refractive index is reduced can be implemented. Further, since the use of a trialkylsilyl-type compound decreases dangling bonds and so forth as well, formation of cracks or air bubbles is suppressed, and this makes it possible to expand the composition selection range for the clad layers 11 and 13.

Subsequently, a trialkylsilyl-type compound used as an organic source for the clad layers 11 and 13 in the present embodiment is described particularly.

In the present embodiment, in order to form the clad layers 11 and 13 as BPSG films, the trialkylsilyl-type compound to be used as an organic source for the clad layers 11 and 13 is tris(trimethylsilyl)borate [SiOB; B(OSi(CH$_3$)$_3$)$_3$].

Figure 2:
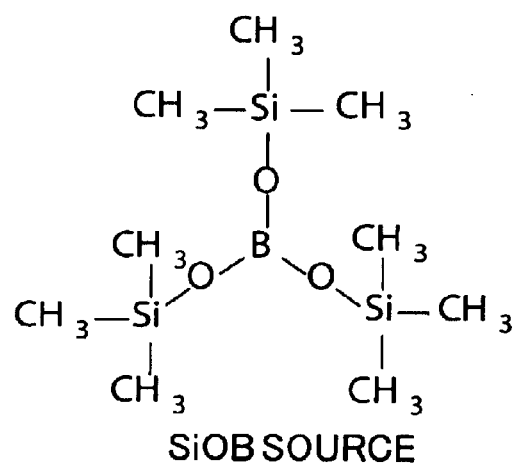
FIG. 2 is a view showing the structure of tris (trimethylsilyl)borate (SiOB) as an example of a trialkylsilyl-type compound used as an organic source in the optical waveguide according to the first embodiment of the present invention.

For example, as shown in FIG. 2, tris(trimethylsilyl) borate (SiOB) has trimethylsilyl bonds [Si(CH$_3$)$_3$—O—B] in its molecular structure (in particular, Si—O—B bonds are included in the organic source from the beginning as seen in FIG. 2). Therefore, since the bond energy of Si—O is high, the tris(trimethylsilyl)borate (SiOB) has an advantage that the structure of Si—O—B is taken into the BPSG film stably.

Therefore, the influence of the heat upon film formation or ununiform doping does not make a factor which causes a dispersion (the variations of composition) to appear in a plane of a wafer or between wafers, and consequently, the dispersion (variations) in refractive index can be suppressed and a uniform refractive index distribution can be achieved.

Further, where a trialkylsilyl-type compound is used as an organic source, since the number of dangling bonds decreases when compared with that in an alternative case wherein an alkoxy-type compound is used as an organic source, formation of cracks by stress concentration upon the dangling bonds or formation of air bubbles by a reaction with carbon (C) or hydrogen (H) can be suppressed. As a result, the composition selection range for the core and the clad can be expanded.

Where the organic source for the clad layers 11 and 13 is formed only from a trimethylsilyl-type compound, there is a defect that it is difficult to adjust the proportion of an additive included in silica glass.

More particularly, for example, where SiOB is used as an organic source for the clad layers 11 and 13, the proportion of B to Si is fixed at 3:1 as apparently seen from FIG. 2. One of methods for facilitating the adjustment of the proportion of an additive contained in silica glass is to use a combination of an alkoxy-type compound and a trialkylsilyl-type compound to form an organic source and form a film from the trialkylsilyl-type compound together with the alkoxy-type compound. Even with the method just described, advantages similar to those achieved where only a trialkylsilyl-type compound is used as described above can be achieved.

In this instance, an arbitrary combination of at least one or more of SiOB, TEOS, TMOS, TEG, TMG, TEOP, TMOP, TEB and TMB may be used as an organic source for the clad in accordance with film formation conditions.

More particularly, in order to reduce the composition of the additive, for example, TEOS or TMOS is used preferably; in order to increase the B composition, for example, TEB or TMB is used preferably; in order to increase the P composition, TEOP or TMOP is used preferably; and in order to increase the Ge composition, TEG, TMG or the like is used preferably.

Figure 3:
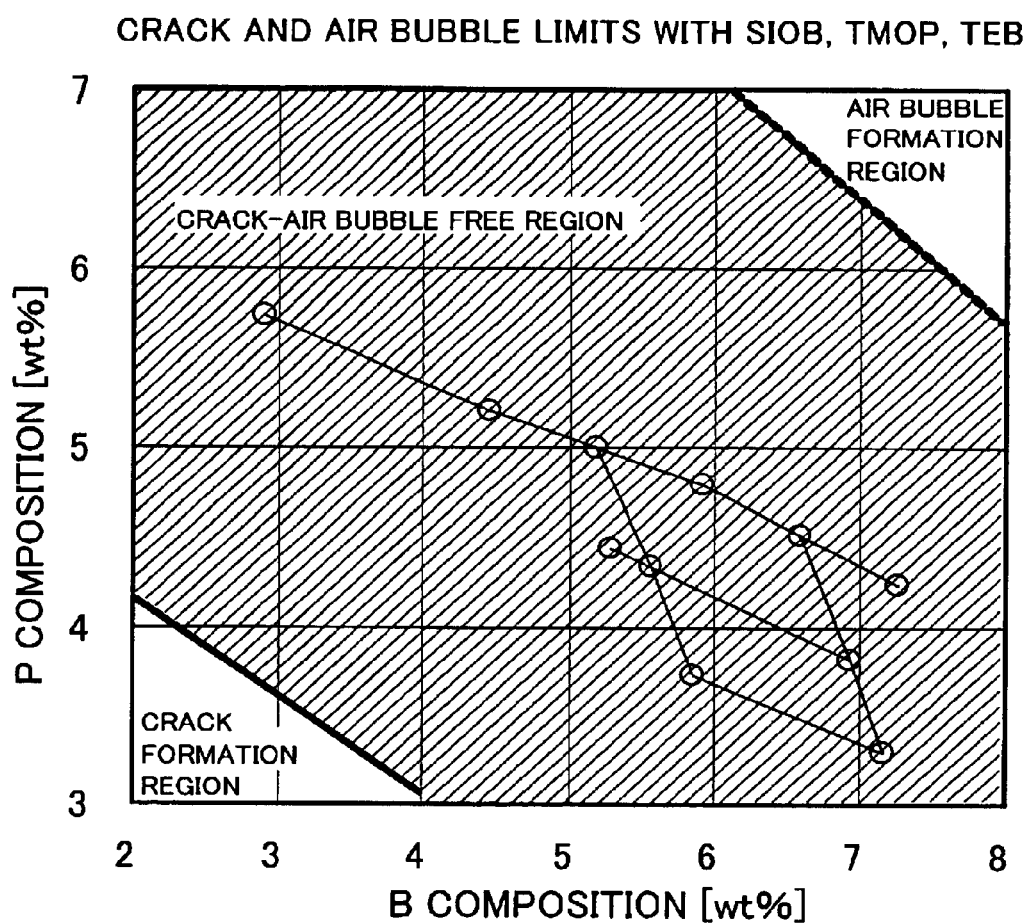
FIG. 3 is a composition chart illustrating crack and air bubble formation regions with respect to the compositions of boron and phosphorus where a trialkylsilyl-type compound is used as an organic source to form a clad (BPSG film) on the optical waveguide according to the first embodiment of the present invention.

FIG. 3 is a view illustrating relationships of cracks and air bubbles to the compositions (wt %) of boron and phosphorus where an organic source formed from a combination of SiOB, TEB and TMOP is decomposed with ozone by an atmospheric pressure CVD method to form a clad layer (BPSG film, silica glass film).

It is to be noted here that FIG. 3 illustrates a result of measurement when a clad layer of a film thickness of 20 $\mu$m is formed at a film formation temperature of 450° C. on a silicon substrate having a thickness of 1 mm and a diameter of 6 inches and annealing process is performed at 880° C. after the film formation.

It can be seen from FIG. 3 that, where an organic source formed from the combination of SiOB, TEB and TMOP is used, the crack formation region and the air bubble formation region are reduced significantly while the crack-air bubble free region in which cracks or air bubbles are not formed indicated by slanting lines in FIG. 3 is expanded thereby to significantly increase the selection ranges for the compositions of boron and phosphorus as particularly seen from the comparison with those in an alternative case wherein only an alkoxy-type compound is used (for example, where an organic source formed from a combination of TEOS, TMOP and TEB is used; refer to FIG. 21).

It is to be noted that, while, in the present embodiment, SiOB is used as the trialkylsilyl-type compound to be contained in the organic source for the clad layers 11 and 13 in order to form the clad layers 11 and 13 each as a BPSG film, alternatively another trialkylsilyl-type compound containing an additive different from them [that is, a substance having a SiR$_3$—O-a bond (where R is an alkyl radical, and a is a substance corresponding to an additive such as B, P, G, Ti, Ta or the like) in its molecular structure] may be used.

For example, such trialkylsilyl-type compounds as tetrakis(trimethylsilyl)germanium [SiOG; Ge(OSi(CH$_3$)$_3$)$_4$], tris(trimethylsilyl)phosphate [SiOP; P(OSi(CH$_3$)$_3$)$_3$], tetrakis(trimethylsilyl)titanium [SiOTi; Ti(OSi(CH$_3$)$_3$)$_4$] and tetrakis(trimethylsilyl)tantalum [SiOTa; Ta(OSi(CH$_3$)$_3$)$_4$] can be used. It is to be noted that SiOP can be used in combination with SiOB to form a BPSG film.

In short, a trialkylsilyl-type compound which includes at least one or more of the Si—O—B bond, Si—O—Ge bond, Si—O—P bond, Si—O—Ti bond and Si—O—Ta bond can be used as the organic source for the clad layers 11 and 13.

Incidentally, even if a trimethylsilyl-type compound is used as an organic source as described above to form the lower clad layer 11, if the difference in proportion (wt %) of the B composition between the lower clad layer 11 and the upper clad layer 13 becomes small (if the difference in B composition becomes insufficient), then a sink is sometimes formed on the core layer 12.

Figure 4:
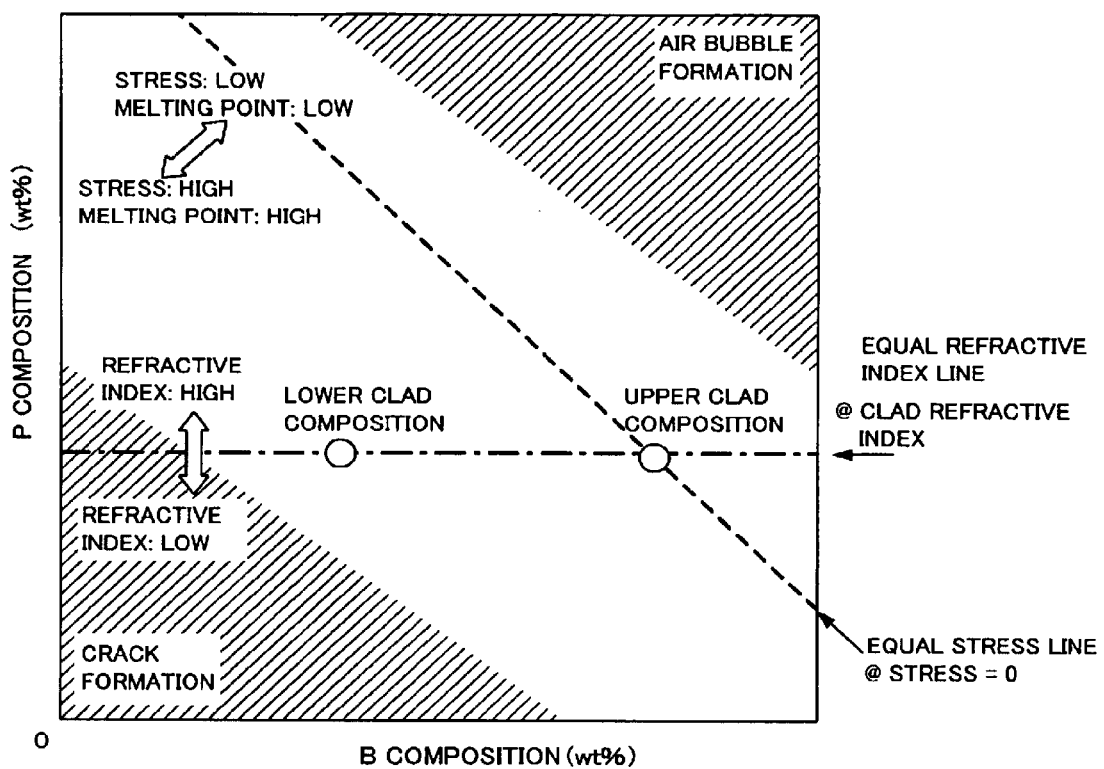
FIG. 4 is a composition chart of a trialkylsilyl-type compound used as an organic source in the optical waveguide according to the first embodiment of the present invention.

FIG. 4 is a composition chart illustrating relationships of cracks and air bubbles to the compositions (wt %) of boron (B) and phosphorus (P) where a trimethylsilyl-type compound is used as an organic source to form a clad layer (BPSG film) on a silicon substrate using an atmospheric pressure CVD method.

In FIG. 4, each of regions indicated by slanting lines indicates a film formation defect appearance composition region in which cracks or air bubbles (film formation defects) are liable to appear, and the other region than the slanting line regions indicates a free composition region in which cracks or air bubbles do not appear.

As seen from FIG. 4, where a trimethylsilyl-type compound is used as an organic source, since the free composition region in which cracks or air bubbles do not appear expands, the degree of freedom in composition design increases when the compositions (wt %) of boron (B) and phosphorus (P) to be contained in the clad layer (trimethylsilyl-type compound) are to be decided.

Further, when the clad layers 11 and 13 are formed on the Si substrate 10, if there is a difference between the thermal expansion coefficient of the Si substrate 10 and the thermal expansion coefficient of the clad layers 11 and 13, then stress (internal stress) appears in the clad layers 11 and 13.

In FIG. 4, a broke line indicates an equal stress line where the stress is zero (stress=0). For example, if the sum of the B composition and the P composition is adjusted so as to be equal to 11 wt % (B composition+P composition=11 wt %), then the stress is reduced to zero (stress=0). It is to be noted that the equal stress lines for different stresses can be represented as parallel lines to the equal stress line in the case wherein the stress is zero in accordance with the magnitude of the stress.

In FIG. 4, on the left side (lower side) of the broken line, the stress is inclined to increase in a compression direction in accordance with a decrease of the boron composition (B composition) and the phosphorus composition (P composition) (conversely speaking, the stress is inclined to decrease in a compression direction in accordance with an increase of the B composition and the P composition). Meanwhile, on the right side (upper side) of the broken line, the stress is inclined to increase in a tension direction in accordance with an increase of the boron composition (B composition) and the phosphorus composition (P composition) (conversely speaking, the stress is inclined to decrease in the tension direction in accordance with a decrease of the B composition and P composition). In short, in FIG. 4, the stress is lowest on the equal stress line indicated by the broken line, but the stress increases as the distance from the equal stress line increases.

Here, that the stress is zero signifies that the thermal expansion coefficient of the clad layers and the thermal expansion coefficient of the Si substrate are equal to each other (the difference in thermal expansion coefficient is zero: liner expansion coefficient difference=0). Therefore, where the stress is zero, the equal stress line can be regarded as an equal thermal expansion coefficient line.

In FIG. 4, on the left side (lower side) of the broken line, the thermal expansion coefficient is inclined to decrease in accordance with a decrease of the boron composition (B composition) and the phosphorus composition (P composition), but on the right side (upper side) of the broken line, the thermal expansion coefficient is inclined to increase in accordance with an increase of the boron composition (B composition) and the phosphorus composition (P composition). Therefore, in FIG. 4, on the left side (lower side) of the broken line, the difference of the thermal expansion coefficient ($d_{clad}-d_{Si}$) between the Si substrate and the clad layers is inclined to increase in accordance with a decrease of the B composition and the P composition (that is, a negative value increases), but on the right side (upper side) of the broken line, the difference in thermal expansion coefficient ($d_{clad}-d_{Si}$) between the Si substrate and the clad layer is inclined to increase in accordance with an increase of the boron composition (B composition) and the phosphorus composition (P composition) (that is, a positive value increases). In short, the thermal expansion coefficient of the clad layers is nearest (equal) to that of the Si substrate 10 on the equal thermal expansion coefficient line indicated by the broken line in FIG. 4, but the difference between the coefficient of the Si substrate 10 and the coefficient of the clad layer increases as the distance from the equal thermal expansion coefficient line increases.

Further, as seen in FIG. 4, the P composition has a dominant influence on the refractive index. In particular, the refractive index increases as the proportion of the P composition increases [that is, the proportion of the P composition (wt %) in the BPSG composition increases], but the refractive index decreases as the proportion of the P composition decreases [that is, the proportion of the P composition (wt %) in the BPSG composition decreases]. It is to be noted that, in FIG. 4, a long dashed short dashed line indicates an equal refractive index line of a refractive index equal to a target refractive index for the upper clad layer 13.

Since the stress of the upper clad layer 13 which covers the side face of the core layer 12 has a dominant influence on the birefringence of the core layer (waveguide core) 12, the composition of the upper clad layer 13 is preferably selected such that the stress thereof is zero (stress=0) (the difference between the thermal expansion coefficient of the Si substrate 10 and the thermal expansion coefficient of the upper clad layer 13 is zero; thermal expansion coefficient difference=0).

Therefore, the composition of the upper clad layer 13 is determined such that the P composition is adjusted so that the upper clad layer 13 has a desired target refractive index and the stress is zero (stress=0). In other words, the upper clad layer 13 is formed so as to have a thermal expansion coefficient substantially equal to that of the Si substrate 10.

More particularly, the composition of the upper clad layer 13 is determined such that it may be equal to the proportion (wt %) of the B composition and the P composition at a point at which the equal refractive index coefficient line indicated by a long dashed short dashed line in FIG. 4 and the equal stress line indicated by the broken line in FIG. 4 where the stress is zero cross each other.

Meanwhile, the composition of the lower clad layer 11 is determined such that it has a substantially same P composition as that of the upper clad layer 13 so that the refractive index of the lower clad layer 11 may be equal to that of the upper clad layer 13. In other words, the composition of the lower clad layer 11 is determined so as to come, for example, on the equal refractive index line indicated by the long dashed short dashed line in FIG. 4.

In this instance, while it is easy to adjust the B composition and the P composition of the lower clad layer 11 so that they may come in the free composition region (region other than the slanting line regions in FIG. 4) as seen in FIG. 4 in order to prevent formation of cracks and air bubbles, if the difference of the proportion (wt %) of the B composition between the lower clad layer 11 and the upper clad layer 13 is reduced (if the B composition difference becomes insufficient), then a sink of the core layer 12 appears.

The melting temperature (melting point) of the clad layers 11 and 13 has a tendency close to that of the stress described hereinabove and is inclined to decrease as the B composition and the P composition increase.

For example, if the B composition difference between the lower clad layer 11 and the upper clad layer 13 is insufficient, then the melting temperature of the lower clad layer 11 comes close to the melting temperature of the upper clad layer 13.

Where the melting temperature of the lower clad layer 11 is close to that of the upper clad layer 13 in this manner, if the BPSG as a material for the upper clad layer 13 upon formation of the upper clad layer 13 is made reflow (the temperature of annealing process for such reflow is set based on the melting temperature of the upper clad layer 13), then also the lower clad layer 11 is softened, and as a result, the core layer (waveguide core) 12 formed on the lower clad layer 11 sinks. This similarly applies also where the melting temperature of the lower clad layer 11 is lower than that of the upper clad layer 13 (that is, the composition of the lower clad comes on the right side with respect to the composition of the upper clad in FIG. 4).

Therefore, in the present embodiment, in order to prevent a sink of the core layer 12, the melting temperature (melting point) of the lower clad layer 11 is set so as to be higher by a predetermined temperature or more than the melting temperature of the upper clad layer 13 (that is, the temperature difference between the melting temperature (melting point) of the lower clad layer 11 and the melting temperature of the upper clad layer 13 is set greater than the predetermined temperature). In other words, the proportion (wt %) of the B composition of the lower clad layer 11 is set lower by a predetermined proportion (for example, 4 wt %) or more than the proportion of the B composition of the upper clad layer 13 [that is, the difference (B composition difference) of the proportion (wt %) of the B composition between the lower clad layer 11 and the upper clad layer 13 is set so as to be greater by a predetermined proportion (for example, 4 wt %)] or more. Basically, the proportion of the B composition of the lower clad layer 11 should be set so as to come on the left side by a great amount as much as possible in the free composition region and on the equal refractive index line in FIG. 4.

More particularly, for example, TEOS, TMOS or the like is contained into the organic source to decrease the amount of TEB, TMB or the like so that the B composition of the lower clad layer 11 may be decreased. For example, where TEB is added to the upper clad layer 13, preferably the amount of TEB in the lower clad layer 11 is decreased (for example, the amount of TEB is reduced to zero) to reduce the B composition of the lower clad layer 11.

Where a trialkylsilyl-type compound is used as an organic source for the clad layers 11 and 13 to sufficiently widen the free composition region in which cracks or air bubbles are not formed and besides the B composition of the lower clad layer 11 is set so as to make the proportion thereof lower by a predetermined proportion or more than the proportion of the B composition of the upper clad layer 13 so that the melting temperature of the lower clad layer 11 may be higher by a predetermined temperature or more than the melting temperature of the upper clad layer 13 as described above, a sink of the core layer 12 can be suppressed while formation of cracks and air bubbles is suppressed.

Further, where the configuration just described is employed, the clad layers 11 and 13 can be formed by collective film formation while formation of cracks is prevented. Consequently, a PLC device having high functions can be fabricated in a small size and in a high integration.

It is to be noted that, while, in the present embodiment, an alkoxy-type compound is used as an organic source for the core layer 12, the organic source is not limited to this, but also a material containing a trialkylsilyl-type compound such as, for example, SiOG, SiOTi, SiOTa, SiOB or SiOP can be used as the organic source.

Further, while, in the present embodiment, a material containing a trialkylsilyl-type compound is used as an organic source for the lower clad layer 11 and the upper clad layer 13 in order to suppress formation of cracks and air bubbles in both of the lower clad layer 11 and the upper clad layer 13, in order to attain the object of the present invention to suppress a sink of the core layer (waveguide core) 12 while formation of cracks and air bubbles is suppressed, a material containing a trialkylsilyl-type compound may be used at least as an organic source for the lower clad layer 11. Therefore, for example, a material containing an alkoxy-type compound can be used as an organic source for the upper clad layer 13. However, a material containing a trialkylsilyl-type compound is used preferably as an organic source also for the upper clad layer 13.

Subsequently, a fabrication process for the present optical waveguide is described in detail with reference to FIGS. 5(A) to 5(D).

The fabrication process of the present optical waveguide is roughly divided into a first step of forming films for the lower clad layer 11 and the core layer 12 on the substrate (for example, Si substrate) 10, a second step of forming the waveguide core 12 having a desired pattern, a third step of forming part of the upper clad layer 113, and a fourth step of forming the remaining part of the upper clad layer 113 as seen from FIGS. 5(A) to 5(D), respectively.

The first to fourth steps mentioned are similar to those of a popular fabrication process for an optical waveguide where an alkoxy-type compound is used except that a trialkylsilyl-type compound is used as an organic source for forming the clad layers 11 and 13 and the core layer 12, and a fabrication apparatus to be used and film forming conditions are basically common to those of the popular fabrication process. Therefore, existing equipments can be used as they are.

Processes performed at the individual steps are described particularly below with reference to FIGS. 5(A) to 5(D).

At the first step (lower film formation step), an organic source for which a material containing at least a trialkylsilyl-type compound (For example, SiOB) is used is decomposed with ozone using an atmospheric pressure CVD apparatus to form a BGSG film on the Si substrate 10 to form the lower clad layer 11 (lower clad layer forming step). For the film formation of the lower clad layer 11, an atmospheric pressure chemical vapor deposition (CVD) method by which film formation can be performed at a low temperature is preferably used from the point of view of reduction of the thermal stress.

For the organic source to be used to form the lower clad layer 11 as a BPSG film, an arbitrary combination from among alkoxy-type compounds (for example, TEOP, TMOP, TEB and TMB) may be used in accordance with film formation conditions in addition to a trialkylsilyl-type compound (for example, SiOB).

More particularly, for example, it is possible to deposit a BPSG film of a film thickness of 15 to 20 $\mu$m on the substrate 10 at a film formation temperature of 380 to 450° C. to form the lower clad layer 11. The lower clad layer 11 is subject to an annealing process for approximately 1 hour in a heat treat furnace of the furnace type at 800 to 1000° C. to further remove water or carbon therefrom.

It is to be noted that the lower clad layer 11 formed at the first step preferably has a proportion of the B composition (concentration of boron) of 1 wt % or more in order to achieve reduction of the polarization mode dispersion (PMD) or the polarization dependent loss (PDL). Further, while it is necessary to lower the proportion of the P composition (concentration of phosphorus) in order to increase the difference in refractive index from the core layer 12, if it is taken into consideration to prevent formation of cracks, the proportion of the P composition is preferably set to 1 wt % or more.

More particularly, the compositions of boron and phosphorus are selected within the free composition region in which cracks or air bubbles are not formed to form the lower clad layer 11.

Specifically, in the present embodiment, in order to prevent a sink of the core layer 12, the melting temperature (melting point) of the lower clad layer 11 is set higher by a predetermined temperature or more than the melting temperature of the upper clad layer 13. In other words, the proportion (wt %) of the B composition of the lower clad layer 11 is set lower by a predetermined proportion (for example, 4 wt %) or more than the proportion of the B composition of the upper clad layer 13. More particularly, the B composition of the lower clad layer 11 may be reduced by causing the organic source to contain, for example, TEOS or TMOS.

Figure 5A:
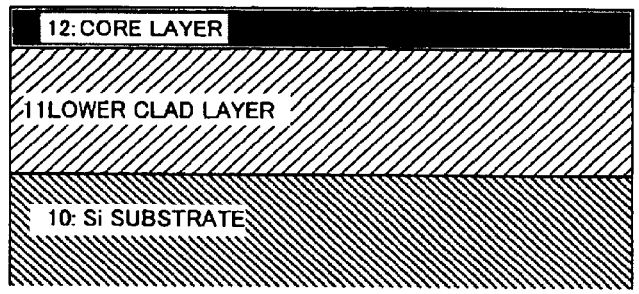
FIGS. 5(A) to 5(D) are views illustrating a fabrication process in a fabrication method for the optical waveguide according to the first embodiment of the present invention.

Then, an organic source for which an alkoxy-type compound (For example, TEOS) is used is decomposed with ozone using an atmospheric pressure CVD method to form the core layer (GPSG film) 12 on the lower clad layer 11 (core layer forming step) as seen in FIG. 5(A). In this manner, preferably an atmospheric pressure CVD (Chemical Vapor Deposition) method wherein film formation can be performed at a low temperature is used for the film formation of the lower clad layer 11 and the core layer 12 from the point of view of reduction of the thermal stress.

For the organic source to be used to form the core layer 12 as a GPSG film, an arbitrary combination from among alkoxy-type compounds (for example, TEOS, TMOS, TEOP, TMOP, TEG and TMG) may be used in accordance with film formation conditions.

More particularly, for example, it is possible to deposit a GPSG film of a film thickness of 5 to 7 $\mu$m on the lower clad layer 11 at a film formation temperature of 380 to 450° C. to form the core layer 12. The core layer 12 is subject to an annealing process similar to that to the lower clad layer 11.

It is to be noted that the Ge composition (concentration of germanium) of the core layer 12 is adjusted so that a desired refractive index difference necessary for waveguiding of light from the lower clad layer 11 may be obtained.

Figure 5B:
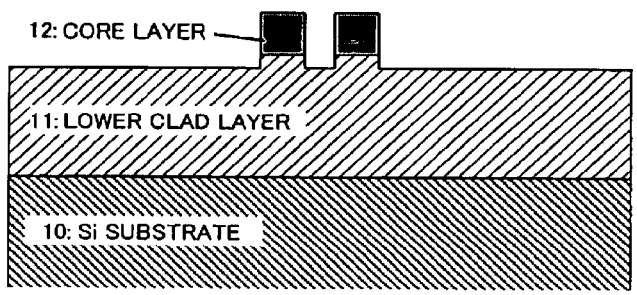

At the second step (core layer forming step, waveguide core forming step), the core layer 12 is patterned into a desired core pattern by a photolithography method as seen in FIG. 5(B). Then, an RIE method is used to perform selective etching (dry etching) to remove unnecessary portions of the core layer 12 to form such a striped core layer (waveguide core) 12 as shown in FIG. 5(B).

Figure 5C:
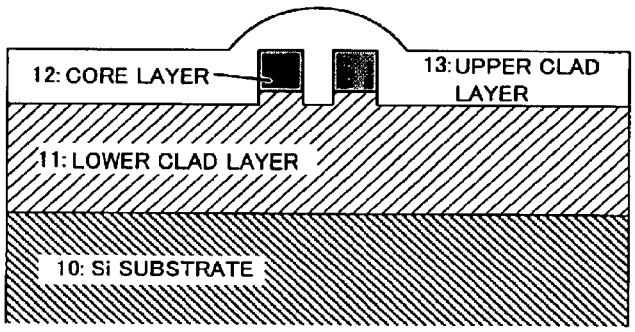

At the third step (buried film forming first step, upper clad layer forming step), part of the upper clad layer 13 is formed on the lower clad layer 11 and the waveguide cores 12 such that the striped waveguide cores 12 maybe buried as shown in FIG. 5(C) in the same conditions as those at the first step described above (buried film formation).

More particularly, a silica glass-type (group) material (for example, BPSG) is deposited on the lower clad layer 11 and the waveguide cores 12 and is made reflow by annealing process in order to form part of the upper clad layer 13 as a thin film of a predetermined thickness. By the process, for example, a groove formed between the adjacent striped waveguide cores 12 is filled up with certainty with the silica glass-type material(for example, BPSG) such that no void may be formed between the striped waveguide cores 12.

In this instance, since the melting temperature (melting point) of the lower clad layer 11 is set higher by a predetermined temperature or more than the melting temperature of the upper clad layer 13 as described above, the lower clad layer 11 is not softened upon the reflow of the upper clad layer 13, and consequently, the waveguide cores 12 can be prevented from sinking.

Figure 5D:
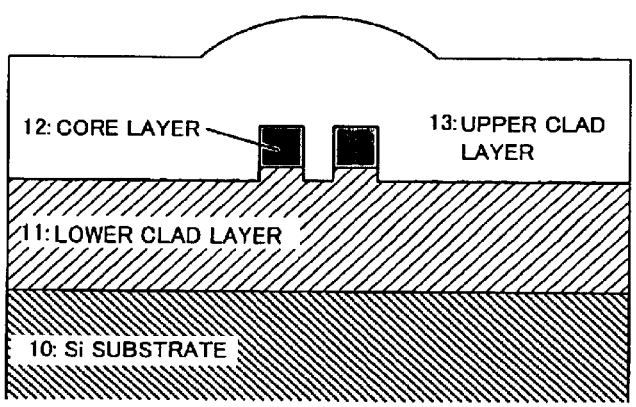

At the fourth step (buried film forming second step, upper clad layer forming step), the remaining part of the upper clad layer 13 is formed on part of the upper clad layer 13 formed at the third step described above in the same conditions as those at the first step described above such that the overall thickness of the upper clad layer 13 may be a predetermined thickness as seen in FIG. 5(D). It is to be noted that the refractive index of the upper clad layer 13 formed in the same conditions as those of the lower clad layer 11 coincides with the refractive index of the lower clad layer 11.

More particularly, an organic source for which a material containing at least a trialkylsilyl-type compound (For example, SiOB) is used is decomposed with ozone using an atmospheric pressure CVD method to form a BPSG film on the lower clad layer 11 and the core layer thereby to form the upper clad layer 13. In this manner, preferably an atmospheric pressure CVD (Chemical Vapor Deposition) method wherein film formation can be performed at a low temperature is used for the film formation of the upper clad layer 13 from the point of view of reduction of the thermal stress.

For the organic source to be used to form the lower clad layer 11 as a BPSG film, an arbitrary combination from among alkoxy-type compounds (for example, TEOP, TMOP, TEB and TMB) may be used in addition to a trialkylsilyl-type compound (for example, SiOB) in accordance with film formation conditions.

Accordingly, with the optical waveguide and the fabrication method therefor according to the present embodiment, there is an advantage that a sink of the core layer (waveguide core) 12 can be suppressed while formation of cracks and air bubbles is suppressed. Since a sink of the core layer (waveguide core) 12 can be suppressed in this manner, a desired waveguide structure can be implemented stably, and an optical waveguide of a high quality can be fabricated.

Particularly where a trialkylsilyl-type compound is used as an organic source for forming the core and the clad (for example, where SiOB which is a novel film forming source is used), formation of cracks and air bubbles is suppressed, and the composition selection range for the core and the clad can be expanded. Consequently, the refractive indices of the clad layers 11 and 13 and the core layer 12 can be designed with a high degree of freedom. Further, since the refractive index of the clad layers 11 and 13 or the core layer 12 can be designed so as to have a rectangular distribution, they are superior in controllability of the refractive index. Furthermore, the waveguide core 12 can be formed with various shapes depending upon the mask pattern upon mask working, and a PLC device of high functions can be fabricated in a small size and in a high integration.

Further, since formation of cracks can be suppressed upon film formation of the clad layers 11 and 13, collective film formation of them can be performed.

Further, since the stress of the core layer 12 is reduced to suppress the birefringence, the polarization mode dispersion (PMD) and the polarization dependent loss (PDL) as waveguide characteristics can be reduced, and characteristics sufficient for an optical waveguide applied to various optical transmission apparatus can be achieved.

Second Embodiment

Now, an optical waveguide and a fabrication method therefor according to a second embodiment are described with reference to FIGS. 6 and 7.

The optical waveguide according to the present embodiment is different from that of the first embodiment in that the lower clad layer is divided into two layers having different compositions from each other. It is to be noted that the configuration of the other part of the optical waveguide according to the present embodiment is similar to that of the first embodiment described above, and therefore, overlapping description thereof is omitted herein to avoid redundancy.

Figure 6:
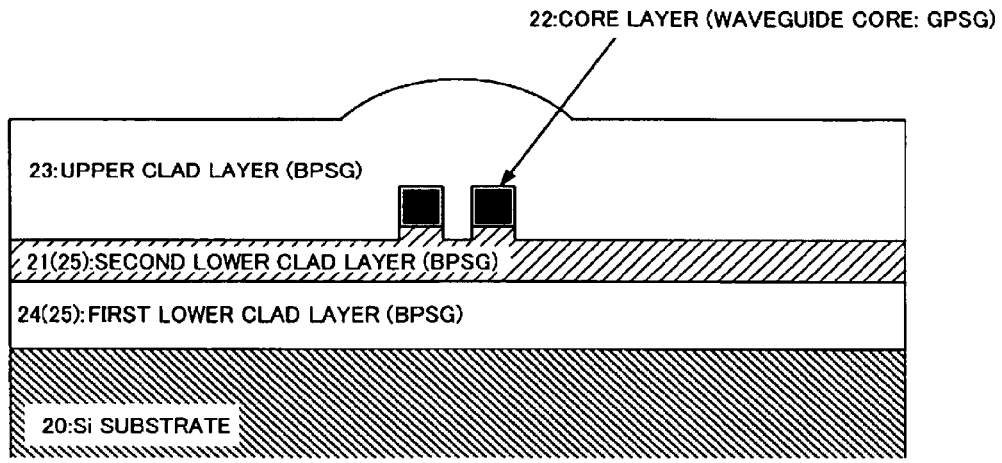
FIG. 6 is schematic sectional view showing a general configuration of an optical waveguide according to a second embodiment of the present invention.

In particular, the present optical waveguide includes a core layer (GPSG film) 22 encircled by clad layers (BPSG films) 25 (21, 24) and 23 formed on a substrate (Si substrate) 20 as seen in FIG. 6. In other words, the present optical waveguide is formed as a buried optical waveguide (for example, a silica glass-type buried optical waveguide, a silica glass-type optical waveguide) wherein the striped core layer (waveguide core) 22 is buried within and between the clad layers 25 (21, 24) and 23.

Particularly, in the present embodiment, the lower clad layer 25 has a two-layer structure including a first lower clad layer 24 which contacts with the substrate 20 and a second lower clad layer 21 including a portion contacting with the core layer 22 (a portion in the proximity of the core layer 22) as shown in FIG. 6.

The second lower clad layer 21 is formed from a silica glass-type material formed using a trialkylsilyl-type compound (for example, SiOB) as an organic source such that the melting temperature thereof is higher by a predetermined temperature or more than the melting temperature of the upper clad layer similarly to the lower clad layer of the first embodiment described hereinabove.

Meanwhile, the first lower clad layer 24 is formed such that it has a thermal expansion coefficient substantially equal to that of the substrate 20 similarly to the upper clad layer of the first embodiment described hereinabove. In other words, the composition of the first lower clad layer 24 is set such that the stress is zero (stress=0) similarly to the upper clad layer of the first embodiment described hereinabove as seen in FIG. 7.

Figure 7:
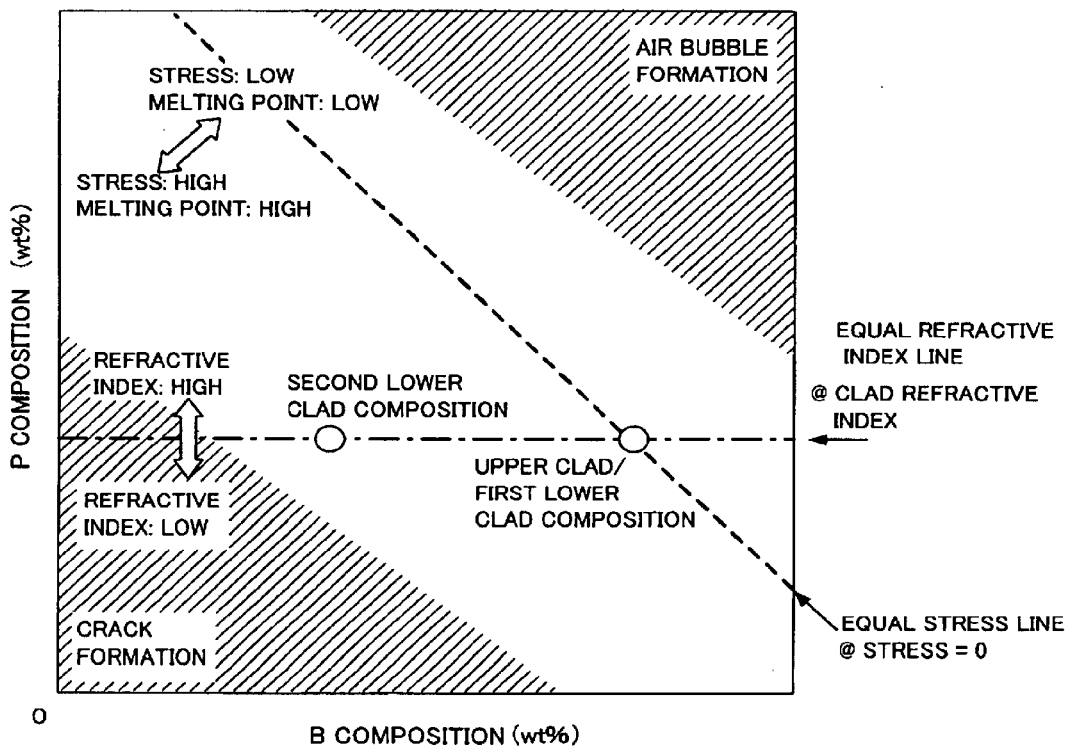
FIG. 7 is a composition chart of a trialkylsilyl-type compound used as an organic source in the optical waveguide according to the second embodiment of the present invention.

More particularly, the composition of the first lower clad layer 24 is determined such that it may have proportions (wt %) of the B composition and the P composition at a point at which an equal refractive index line indicated by a long dashed short dashed line in FIG. 7 and an equal stress line where the stress is zero indicated by a broken line in FIG. 7.

The reason why the lower clad layer 25 is formed in two layers is such as follows.

In particular, the birefringence of the optical waveguide is influenced dominantly by the stress acting upon the upper clad layer 23. The stress acting upon the upper clad layer 23 originates from the difference in thermal expansion coefficient between the upper clad layer 23 and the Si substrate 20. Thus, if the optical waveguide is designed such that the melting temperature of the lower clad layer is higher than that of the upper clad layer 23 similarly as in the first embodiment described hereinabove, then the thermal expansion coefficient of the lower clad layer becomes lower than the thermal expansion coefficient of the upper clad layer (that is, the difference in thermal expansion coefficient between the lower clad layer and the Si substrate becomes greater than the difference in thermal expansion coefficient between the upper clad layer and the Si substrate). As a result, even if the Si substrate and the upper clad layer are designed such that they have an equal thermal expansion coefficient, stress (tension direction) acts upon the upper clad layer from the lower clad layer.

Therefore, in the present embodiment, taking the foregoing into consideration, the lower clad layer 25 is formed so as to minimize the composition portion for a high melting temperature (high melting point) which makes a cause of internal stress in order to reduce the stress (tensile stress) from the lower clad layer 25 to the upper clad layer 23. In particular, in the present embodiment, the lower clad layer 25 is formed in the two-layer structure including the second lower clad layer (high melting temperature layer) 21 designed so as to have a melting temperature higher by a predetermined temperature or more than the melting temperature of the upper clad layer 23 and the first lower clad layer (stress reduction layer) 24 designed so as to reduce the stress from the lower clad layer 25 to the upper clad layer 23, and the first lower clad layer 24 is formed with a thickness as small as possible.

The fabrication method for the optical waveguide according to the present embodiment is different from the fabrication method of the first embodiment described hereinabove in the lower clad layer forming step included in the first step. It is to be noted that the other steps are similar to those of the first embodiment described hereinabove, and therefore, overlapping description thereof is omitted herein to avoid redundancy.

In particular, in the present embodiment, in order to form the lower clad layer of the optical waveguide in a two-layer structure, the lower clad layer forming step includes a step of forming the first lower clad layer 24 having a thermal expansion coefficient substantially equal to that of the substrate 20 on the substrate 20, and another step of forming the second lower clad layer 21 from a silica glass-type material formed using a trialkylsilyl-type compound as an organic source on the first lower clad layer 24 such that it has a melting temperature higher by a predetermined temperature or more than the melting temperature of the upper clad layer 23.

Accordingly, with the optical waveguide and the fabrication method therefor according to the present embodiment, at least only a portion of the lower clad layer 25 at which the lower clad layer 25 contacts with the core layer 22 (that is, a portion of the lower clad layer 25 in the proximity of the core layer 22; second lower clad layer 21) has a higher melting temperature than that of the upper clad layer 23 so that the stress (internal stress) acting upon the upper clad layer 23 from the other portion (first lower clad layer 24) of the lower clad layer 25 than the portion of the lower clad layer 25 at which the lower clad layer 25 contacts with the core layer (waveguide core) 22. Therefore, similarly as with the first embodiment described hereinabove, a sink of the core layer (waveguide core) 22 can be suppressed while formation of cracks and air bubbles is suppressed. Further, since the birefringence of the optical waveguide can be further reduced, the polarization mode dispersion (PMD) and the polarization dependent loss (PDL) can be reduced effectively.

It is to be noted that, while the first lower clad layer 24 in the embodiment described above is formed such that it has a thermal expansion coefficient substantially equal to that of the Si substrate 20 in order to reduce the birefringence of the optical waveguide, in order to make it possible to suppress a sink of the core layer (waveguide core) 22 while formation of cracks and air bubbles is suppressed, the first lower clad layer 24 need not necessarily be formed in this manner, but the composition of the first lower clad layer 24 can be selected freely.

Further, in the present embodiment, a material including a trialkylsilyl-type compound is used as an organic source for the first lower clad layer 24 and the second lower clad layer 21 in order to suppress formation of cracks and air bubbles in both of the first lower clad layer 24 and the second lower clad layer 21. However, in order to achieve the object of the present invention to suppress a sink of the core layer (waveguide core) 22 while formation of cracks and air bubbles is suppressed, a material containing a trialkylsilyl-type compound should be used at least as an organic source for the second lower clad layer 21. Therefore, a material containing, for example, an alkoxy-type compound can be used as an organic source for the first lower clad layer 24. However, a material containing a trialkylsilyl-type compound is preferably used as an organic source for the first lower clad layer 24.

Third Embodiment

Now, an optical waveguide and a fabrication method therefor according to a third embodiment of the present invention are described with reference to FIGS. 8 and 9.

The optical waveguide according to the present embodiment is different from that of the first embodiment in that the upper clad layer is divided into two layer having different compositions from each other. It is to be noted that the configuration of the other part of the optical waveguide according to the present embodiment is similar to that of the first embodiment described above, and therefore, overlapping description thereof is omitted herein to avoid redundancy.

Figure 8:
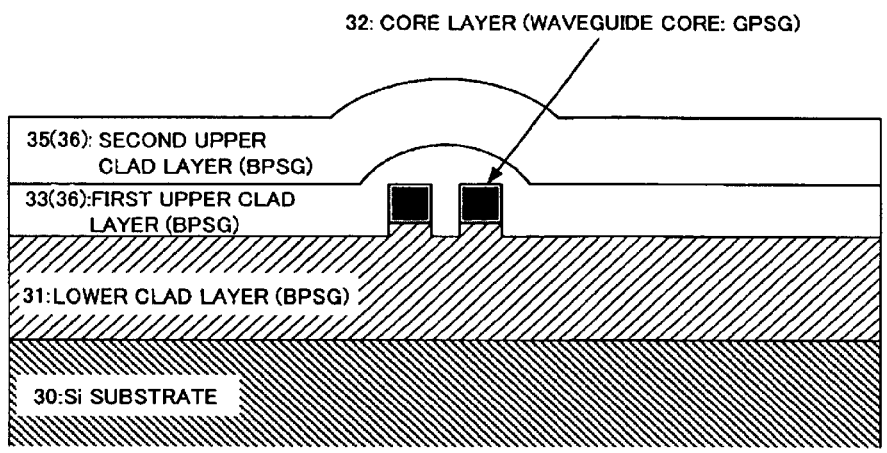
FIG. 8 is a schematic sectional view showing a general configuration of an optical waveguide according to a third embodiment of the present invention.

In particular, the present optical waveguide includes a core layer (GPSG film) 32 encircled by clad layers (BPSG films) 31 and 36 (33 and 35) formed on a substrate (Si substrate) 30 as seen in FIG. 8. In other words, the present optical waveguide is formed as an buried optical waveguide (for example, a silica glass-type buried optical waveguide, a silica glass-type optical waveguide) wherein a striped core layer (waveguide core) 32 is buried within and between the clad layers 31 and 36 (33 and 35).

Particularly, in the present embodiment, the upper clad layer 32 has a two-layer structure including a first upper clad layer 33 which includes a portion which contacts with the core layer 32 and a second upper clad layer 35 formed on the first upper clad layer 33.

The first upper clad layer 33 is formed such that it has a thermal expansion coefficient substantially equal to that of the Si substrate 30 similarly to the upper clad layer of the first embodiment described hereinabove. In other words, the composition of the first upper clad layer 33 is set such that the stress is zero (stress=0) similarly to the upper clad layer of the first embodiment described hereinabove as seen in FIG. 9.

Figure 9:
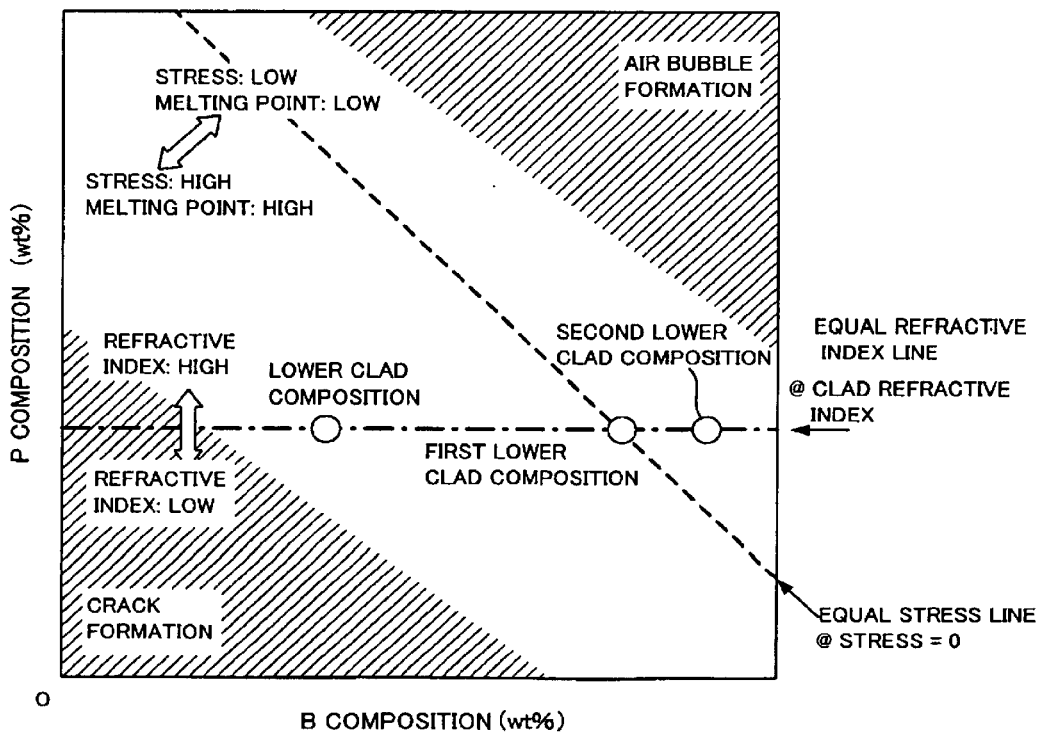
FIG. 9 is a composition chart of a trialkylsilyl-type compound used as an organic source in the optical waveguide according to the third embodiment of the present invention.

More particularly, the composition of the first upper clad layer 33 is determined such that it may have proportions (wt %) of the B composition and the P composition at a point at which an equal refractive index line indicated by a long dashed short dashed line in FIG. 9 and an equal stress line where the stress is zero indicated by a broken line in FIG. 9.

Meanwhile, the second upper clad layer 35 is formed such that it has a coefficient of liner expansion higher than that of the Si substrate 30 as seen in FIG. 9.

In this manner, in the present embodiment, since the thermal expansion coefficient of the second upper clad layer 35 is set higher than that of the first upper clad layer 33 (that is, higher than the thermal expansion coefficient of the Si substrate 30) so that compression stress may be produced in the first upper clad layer 33, the tensile stress produced in the upper clad layer due to the difference of the thermal expansion coefficient between the lower clad layer and the upper layer is canceled as pointed out in connection with the second embodiment described hereinabove.

It is to be noted that, while the present embodiment is designed such that the upper clad layer 36 is formed in a two-layer structure including the first upper clad layer 33 and the second upper clad layer 35 and compressive stress is produced in the first upper clad layer 33 by the second upper clad layer 35, the method of producing such compressive stress is not limited to this, but even if the upper clad layer is not formed in two layers, it is possible to set the thermal expansion coefficient of the entire upper clad layer 36 higher than that of the Si substrate 30 so as to produce compressive stress a little over the entire upper clad layer 36 so that the tensile stress produced in the upper clad layer may be canceled by the difference of the thermal expansion coefficient between the lower clad layer and the upper clad layer.

The fabrication method for the optical waveguide according to the present embodiment is different from the fabrication method of the first embodiment described hereinabove in the upper clad layer forming steps included in the third and fourth steps. It is to be noted that the other steps are similar to those of the first embodiment described hereinabove, and therefore, overlapping description thereof is omitted herein to avoid redundancy.

In particular, in the present embodiment, in order to form the upper clad layer 36 of the optical waveguide in a two-layer structure, the upper clad layer forming steps include a step (first upper clad layer forming step) of forming the first upper clad layer 33 having a thermal expansion coefficient substantially equal to that of the substrate 30 such that it encircles the waveguide core 32 formed on the lower clad layer 31, and another step (second upper clad layer forming step) of forming the second upper clad layer 35 having a thermal expansion coefficient higher than that of the substrate 30 on the first upper clad layer 33.

For example, the third step in the first embodiment described above may be changed the first upper clad layer forming step while the fourth step in the first embodiment described above is changed to the second upper clad layer forming step.

Accordingly, with the optical waveguide and the fabrication method therefor according to the present embodiment, since the lower clad layer 31 is formed so has to have a higher melting temperature than a portion of the upper clad layer 36 at which the upper clad layer 36 contacts with the core layer (waveguide core) 32 (that is, a portion of the upper clad layer 36 in the proximity of the core layer 32; first upper clad layer 33) so that the stress (internal stress) acting upon the portion of the upper clad layer 36 at which the upper clad layer 36 contacts with the core layer (waveguide core) 32 (that is, a portion of the upper clad layer 36 in the proximity of the core layer 32; first upper clad layer 33), a sink of the core layer 32 can be suppressed while formation of cracks and air bubbles is suppressed. Further, since the birefringence of the optical waveguide can be further reduced, the polarization mode dispersion (PMD) and the polarization dependent loss (PDL) can be reduced to improve the polarization characteristic effectively.

It is to be noted that, while the second upper clad layer 35 in the embodiment described above is formed such that it has a thermal expansion coefficient higher than that of the Si substrate 30 in order to reduce the birefringence of the optical waveguide, in order to make it possible to suppress a sink of the core layer 32 while formation of cracks and air bubbles is suppressed, the second upper clad layer 35 need not necessarily be formed in this manner, but the composition of the second upper clad layer 35 can be selected freely.

Further, in the present embodiment, a material including a trialkylsilyl-type compound is used as an organic source for the lower clad layer 31 and the upper clad layer 36 in order to suppress formation of cracks and air bubbles in both of the lower clad layer 31 and the upper clad layer 36. However, in order to achieve the object of the present invention to suppress a sink of the core layer (waveguide core) 32 while formation of cracks and air bubbles is suppressed, a material containing a trialkylsilyl-type compound should be used at least as an organic source for the lower clad layer 31. Therefore, a material containing, for example, an alkoxy-type compound can be used as an organic source for the upper clad layer 36. However, a material containing a trialkylsilyl-type compound is preferably used as an organic source also for the upper clad layer 36.

Fourth Embodiment

Now, an optical waveguide and a fabrication method therefor according to a fourth embodiment of the present invention are described with reference to FIG. 10.

The optical waveguide according to the present embodiment is a combination of the configurations of the optical waveguides of the second and third embodiments described hereinabove.

Figure 10:
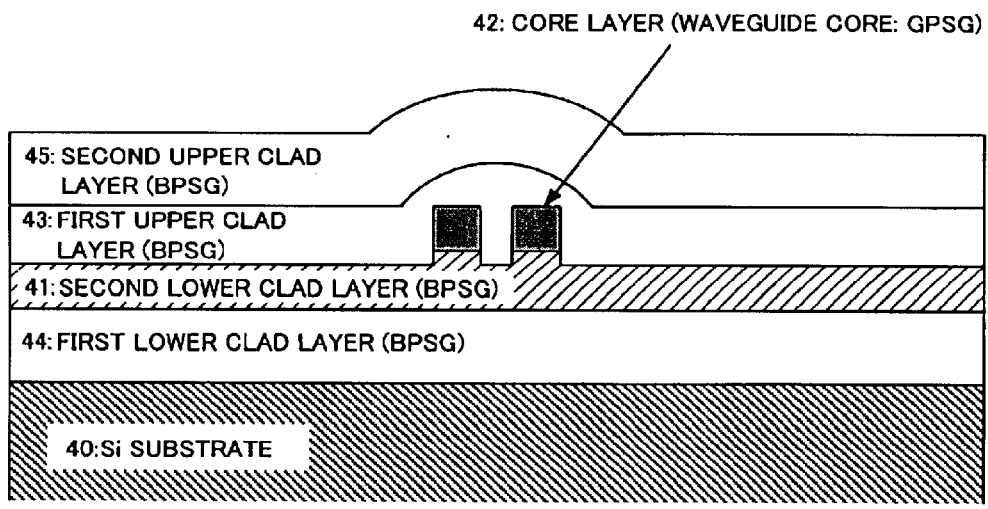
FIG. 10 is a schematic sectional view showing a general configuration of an optical waveguide according to a fourth embodiment of the present invention.

In particular, the present optical waveguide includes a core layer (GPSG film) 42 encircled by clad layers (BPSG films) 44, 41, 43 and 45 formed on a substrate (Si substrate) 40 as seen in FIG. 10. In other words, the present optical waveguide is formed as an buried optical waveguide (for example, a silica glass-type buried optical waveguide, a silica glass-type optical waveguide) wherein a striped core layer (waveguide core) 42 is buried within the clad layers 44, 41, 43 and 45.

Particularly, in the present embodiment, the lower clad layer 25 has a two-layer structure including a first lower clad layer 44 which contacts with the substrate 40 and a second lower clad layer 41 including a portion contacting with the core layer 42 (a portion in the proximity of the core layer 42) as shown in FIG. 10. Further, the upper clad layer has a two-layer structure including a first upper clad layer 43 which includes a portion which contacts with the core layer 42 (a portion in the proximity of the core layer 42) and a second upper clad layer 45 formed on the first upper clad layer 43.

It is to be noted that details of the structure of the optical waveguide and the fabrication method therefor are similar to those of the second and third embodiments described above, and therefore, overlapping description thereof is omitted herein to avoid redundancy.

Accordingly, with the optical waveguide and the fabrication method therefor according to the present embodiment, advantages achieved by the configurations of the second and third embodiments described above are achieved. In addition, since there is no necessity to vary the thermal expansion coefficient of the first lower clad layer 44 or the second upper clad layer 45 by a great amount in order to reduce the tensile stress produced in the upper clad layer by the difference of the thermal expansion coefficient between the upper clad layer and the lower clad layer as pointed out in the description of the second embodiment described hereinabove, there is an advantage that the degree of freedom in composition design increases. In short, since there is no necessity to vary the composition of the first lower clad layer 44 or the second upper clad layer 45 to produce very high tensile stress or compressive stress, there is an advantage that the degree of freedom in composition design increases.

Fifth Embodiment

Now, an optical waveguide and a fabrication method therefor according to a fifth embodiment are described with reference to FIG. 11.

The optical waveguide according to the present embodiment is different from that of the first embodiment in that it additionally includes a surface protective layer.

Figure 11:
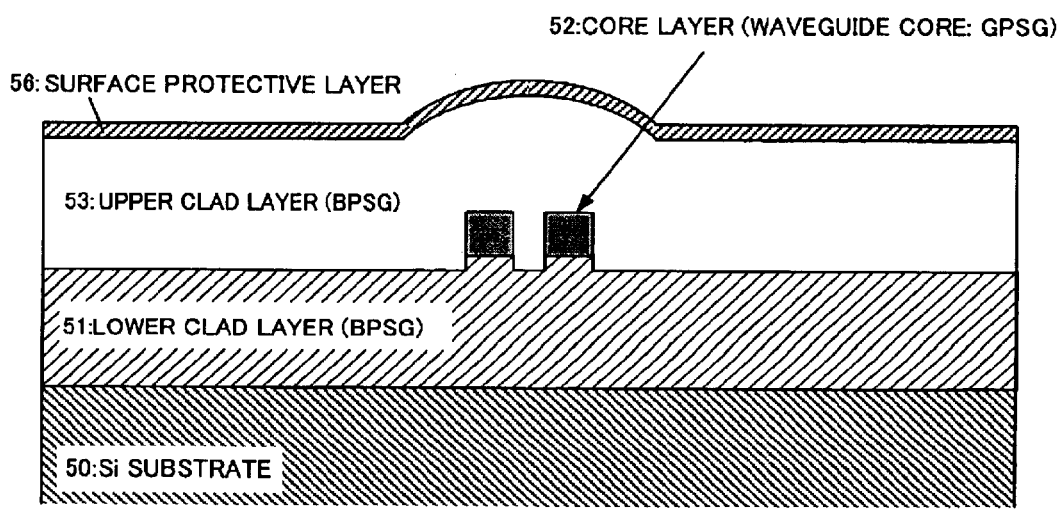
FIG. 11 is a schematic sectional view showing a general configuration of an optical waveguide according to a fifth embodiment of the present invention.

In particular, the present optical waveguide includes a core layer (GPSG film) 52 encircled by clad layers (BPSG films) 51 and 53 formed on a substrate (Si substrate) 50 as seen in FIG. 11. In other words, the present optical waveguide is formed as an buried optical waveguide (for example, a silica glass-type buried optical waveguide, a silica glass-type optical waveguide) wherein the striped core layer (waveguide core) 52 is buried within and between the clad layers 51 and 53. Further, a protective layer (surface protective layer) 56 is provided on the surface of the upper clad layer 53.

It is to be noted that the configuration of the other part of the optical waveguide and the fabrication method therefor are similar to those of the first embodiment described above, and therefore, overlapping description thereof is omitted herein to avoid redundancy.

The protective layer 56 is preferably formed from BPSG of a low additive concentration (a composition in a region wherein both of the B composition and the P composition are low in FIG. 4), PSG (phosphorus-doped silica glass; a composition on the axis of ordinate in FIG. 4 where the B composition is 0 wt %), NSG (non-doped silica glass; a composition at the origin in FIG. 4 where the B composition and the P composition are 0 wt %) or the like.

Accordingly, with the optical waveguide and the fabrication method therefor according to the present embodiment, advantages achieved by the configuration of the first embodiment described above are achieved. In addition, since the protective layer 56 is provided, there is an advantage that the BPSG film which forms the upper clad layer 53 can be prevented from being deteriorated by water and so forth in the atmospheric air. With the optical waveguide according to the present embodiment, since the proportion (wt %) of the B composition of the upper clad layer 53 is higher than that of common optical waveguides, it is particularly effective to provide the protective layer 56 to prevent the deterioration of the upper clad layer 53.

Sixth Embodiment

Now, an optical waveguide and a fabrication method therefor according to a sixth embodiment are described with reference to FIGS. 12 and 13.

The optical waveguide according to the present embodiment is different from that of the first embodiment in that the core layer (waveguide core) is formed as a BPSG film.

Figure 12:
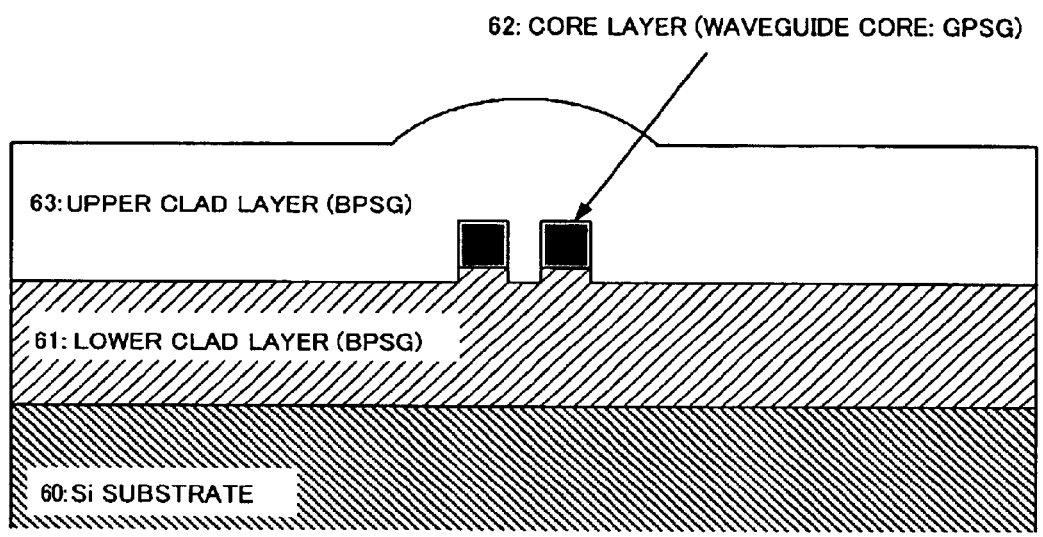
FIG. 12 is a schematic sectional view showing a general configuration of an optical waveguide according to a sixth embodiment of the present invention.

In particular, the present optical waveguide includes a core layer (GPSG film) 62 encircled by clad layers (BPSG films) 61 and 63 formed on a substrate (Si substrate) 60 as seen in FIG. 12. In other words, the present optical waveguide is formed as a buried optical waveguide (for example, a silica glass-type buried optical waveguide, a silica glass-type optical waveguide) wherein the striped core layer (waveguide core) 62 is buried within and between the clad layers 61 and 63.

Particularly in the present embodiment, the core layer 62 is formed from, for example, BPSG (borophospho-silicate glass; silica glass-type material). For example, a trialkylsilyl-type compound may be used as an organic source for forming the core layer 62 as a BPSG film similarly as in the first embodiment described hereinabove.

Although it is difficult to raise the refractive index of the BPSG significantly, the BPSG is superior in the low stress property. Therefore, where the core layer 62 is formed as a PBSG film, it can be formed so as to have a thermal expansion coefficient substantially equal to that of the Si substrate 60. In other words, the composition of the core layer 62 can be designed so that the stress produced in the upper clad layer 63 may be reduced to zero (stress=0) by the difference in thermal expansion coefficient between the core layer 62 and the Si substrate 60 as seen in FIG. 13.

Figure 13:
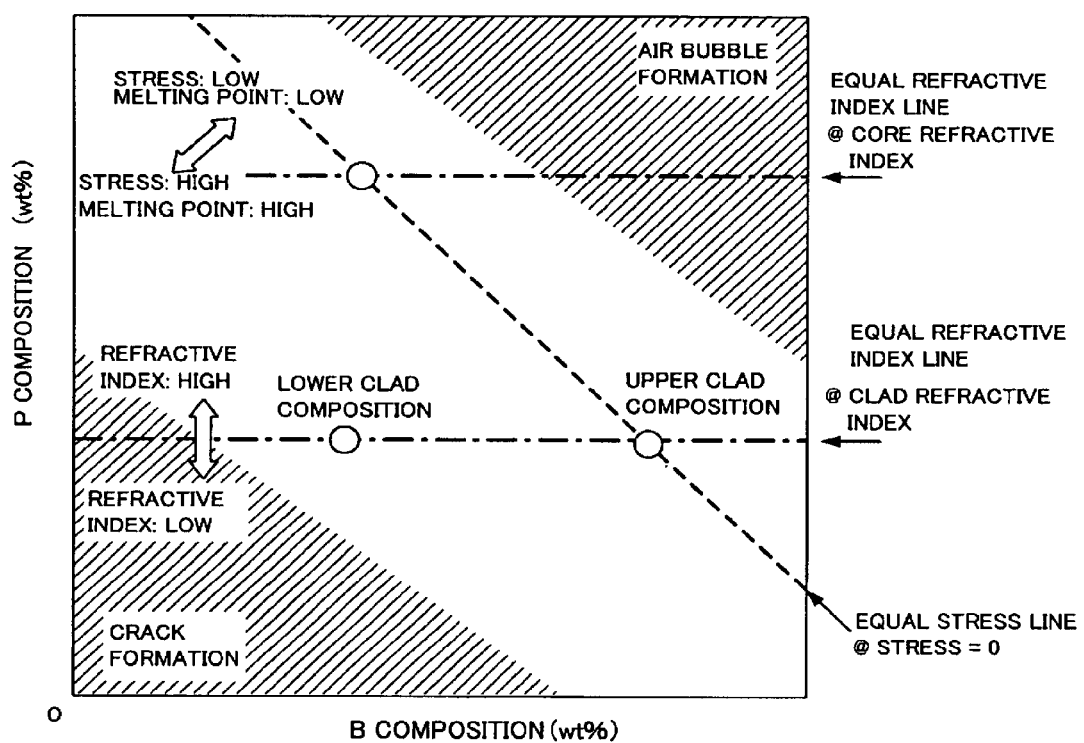
FIG. 13 is a composition chart of a trialkylsilyl-type compound used as an organic source in the optical waveguide according to the sixth embodiment of the present invention.

More particularly, the composition of the core layer 62 is determined so as to come on an equal stress line where the stress is zero as indicated by a broken line in FIG. 13. In particular, since a long dashed double-short dashed line in FIG. 13 indicates an equal refractive index line of the refractive index equal to the target refractive index for the core layer 62, the composition of the core layer 62 is determined so as to have the proportions (wt %) of the B composition and the P composition at a point at which the equal refractive index line indicated by the long dashed double-short dashed line and the equal stress line for the stress of 0 indicated by the broken line in FIG. 13 cross each other.

It is to be noted that the configuration of the other part of the optical waveguide and the fabrication method therefor are similar to those of the first embodiment described above, and therefore, overlapping description thereof is omitted herein to avoid redundancy.

Accordingly, with the optical waveguide and the fabrication method therefor according to the present embodiment, advantages achieved by the configuration of the first embodiment described above are achieved. In addition, not only reduction of the stress produced in the upper clad layer 63 which is a principal factor of the birefringence of the optical waveguide can be achieved, but also reduction of the stress produced in the core layer 62 can be achieved. Since the birefringence of the core layer 62 can be further reduced in this manner, there is an advantage that the polarization mode dispersion (PMD) and the polarization dependent loss (PDL) can be reduced.

It is to be noted that, while, in the present embodiment, the core layer of the optical waveguide according to the first embodiment described hereinabove is formed as a BPSG film, what is formed as a BPSG film is not limited to the core layer mentioned, but the core layer of the optical waveguide of any of the second to fifth embodiments may be formed as a BPSG film.

Seventh Embodiment

Subsequently, an optical waveguide device according to a seventh embodiment is described with reference to FIG. 14.

The optical waveguide device according to the present embodiment is structured such that heat insulating grooves 78A and 78B are formed on the optical waveguide of the first embodiment and a thin film heater 77 is provided additionally.

Figure 14:
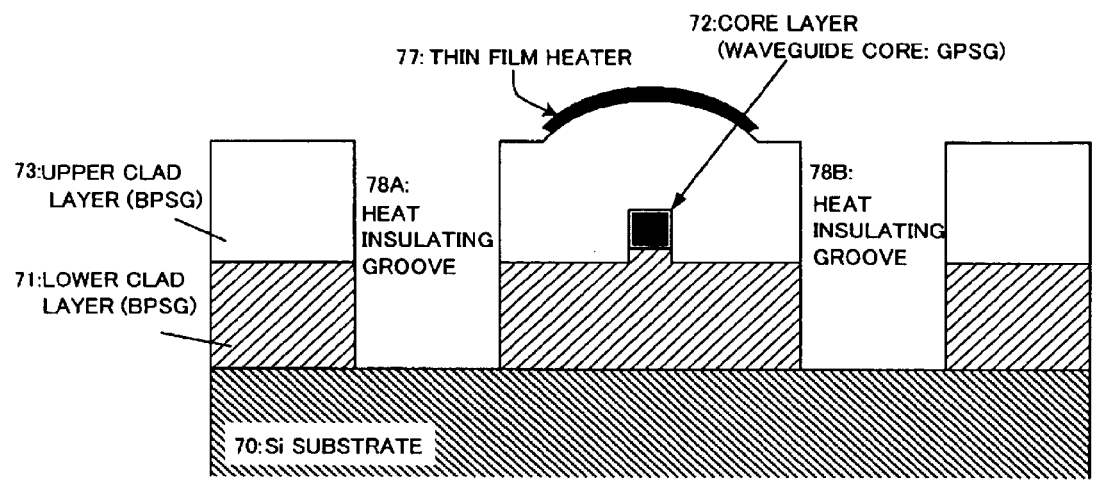
FIG. 14 is a schematic sectional view showing a general configuration of an optical waveguide device according to a seventh embodiment of the present invention.

In particular, the optical waveguide of the present optical waveguide device includes a core layer (GPSG film) 72 encircled by clad layers (BPSG films) 71 and 73 formed on a substrate (Si substrate) 70 as shown in FIG. 14. In other words, the present optical waveguide is formed as an buried optical waveguide (for example, a silica glass-type buried optical waveguide, a silica glass-type optical waveguide) wherein the striped core layer (waveguide core) 72 is buried within and between the clad layers 71 and 73.

The optical waveguide formed in such a manner as just described has a pair of heat insulating grooves 78A and 78B formed therein so that the thermal resistance of the core layer 72 can be raised. Further, the thin film heater 77 is provided on the surface of the upper clad layer 73 such that it extends along the core layer 72 thereby to form a phase modulator (optical waveguide device) which makes use of the thermo-optic effect (TO effect).

In the phase modulator formed in this manner, the refractive index of the core layer 72 can be varied by applying heat to the quartz-type optical waveguide by means of the thin film heater 77, for example, provided on the surface of the upper clad layer 73 to raise the temperature of the core layer 72, whereby phase control of an optical signal propagating in the optical waveguide can be performed.

Particularly with the optical waveguide which uses such a TO effect as described above, it is preferable to use the Si substrate 70 having a low thermal resistance in order to prevent thermal interference between adjacent waveguide cores 72.

The heat insulating grooves 78A and 78B are formed by partly removing the upper clad layer 73 and the lower clad layer 71 such that the surface of the substrate 70 is exposed. Provision of such heat insulating grooves 78A and 78B can raise the thermal resistance of the core and reduce the power consumption.

It is to be noted that, while the present embodiment is formed as an example wherein a thin film heater and heat insulating grooves are provided on the optical waveguide of the first embodiment described hereinabove, provision of them is not limited to the first embodiment, but a thin film heater and heat insulating grooves may be provided alternatively on the optical waveguide of any of the second to sixth embodiments described above to form a phase modulator (optical waveguide device).

For example, it is possible to provide a thin film heater and heat insulating grooves on the optical waveguide of the fourth embodiment described hereinabove to form a phase modulator.

Figure 15:
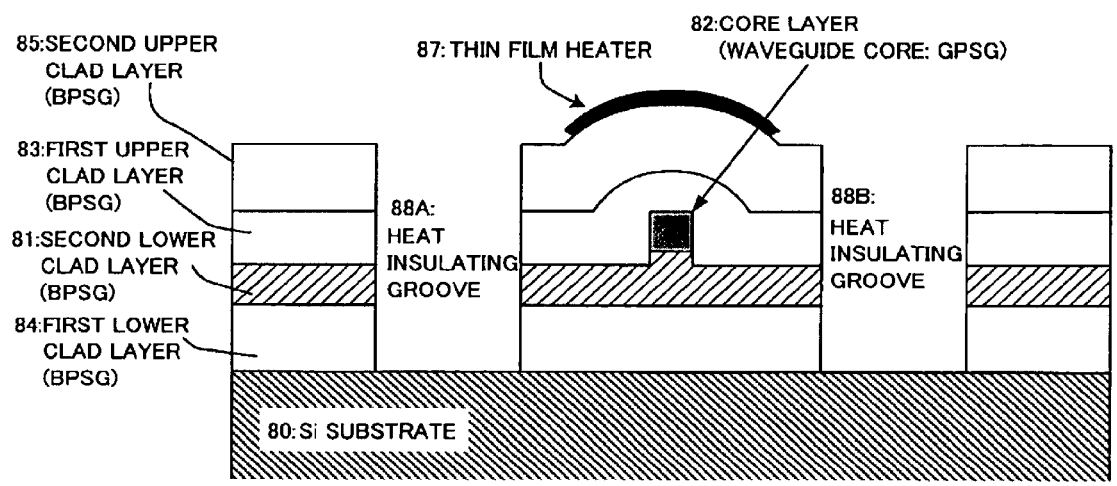
FIG. 15 is a schematic sectional view showing a general configuration of an optical waveguide device according to a modification to the seventh embodiment of the present invention.

In this instance, the optical device of the present optical waveguide device includes a core layer (GPSG film) 82 encircled by clad layers (BPSG films) 84, 81, 83 and 85 formed on a substrate (Si substrate) 80 as shown in FIG. 15. In other words, the present optical waveguide is formed as a buried optical waveguide (for example, a silica glass-type buried optical waveguide, a silica glass-type optical waveguide) wherein the striped core layer (waveguide core) 82 is buried within the clad layers.

Particularly, the lower clad layer is formed in a two-layer structure including a first lower clad layer 84 which contacts with the substrate 80 and a second lower clad layer 81 including a portion contacting with the core layer 82 (a portion in the proximity of the core layer 82) as shown in FIG. 15. Further, the upper clad layer is formed in a two-layer structure including a first upper clad layer 83 which includes a portion which contacts with the core layer 82 (a portion in the proximity of the core layer 82) and a second upper clad layer 85 formed on the first upper clad layer 83.

The optical waveguide formed in such a manner as just described has a pair of heat insulating grooves 88A and 88B formed therein for raising the thermal resistance of the core layer 82. Further, the thin film heater 87 is provided on the surface of the second upper clad layer 85 such that it extends along the core layer 82 thereby to form a phase modulator (optical waveguide device) which makes use of the thermo-optic effect (TO effect).

Incidentally, where the heat insulating grooves 78A and 78B are provided such that the surface of the substrate 70 is exposed as in the present embodiment, there is the possibility that the stress of the optical waveguide may be moderated at the locations of the heat insulating grooves 78A and 78B and the stress of the optical waveguide may vary from that at the other portions of the optical waveguide at which the heat insulating grooves 78A and 78B are not provided. Where such a stress variation by the heat insulating grooves 78A and 778B as just described is taken into consideration, it is preferable to adopt a structure wherein the stress of the core layer 72 is low, for example, such an optical waveguide structure as in the sixth embodiment described hereinabove (refer to FIGS. 12 and 13). This is effective to reduce the birefringence of the optical waveguide and reduce the polarization mode dispersion (PMD) and the polarization dependent loss (PDL).

It is to be noted that, while in the present embodiment and the modification thereto, the heat insulating grooves are formed such that they extend through the upper clad layer and the lower clad layer to the Si substrate as described hereinabove with reference to FIGS. 14 and 15, the structure of the heat insulating grooves is not limited to this.

For example, in order to provide a thin film heater and heat insulating grooves on the optical waveguide of the third embodiment described hereinabove to form a phase modulator (optical waveguide device), the following heat insulating groove structure may be employed.

Figure 16:
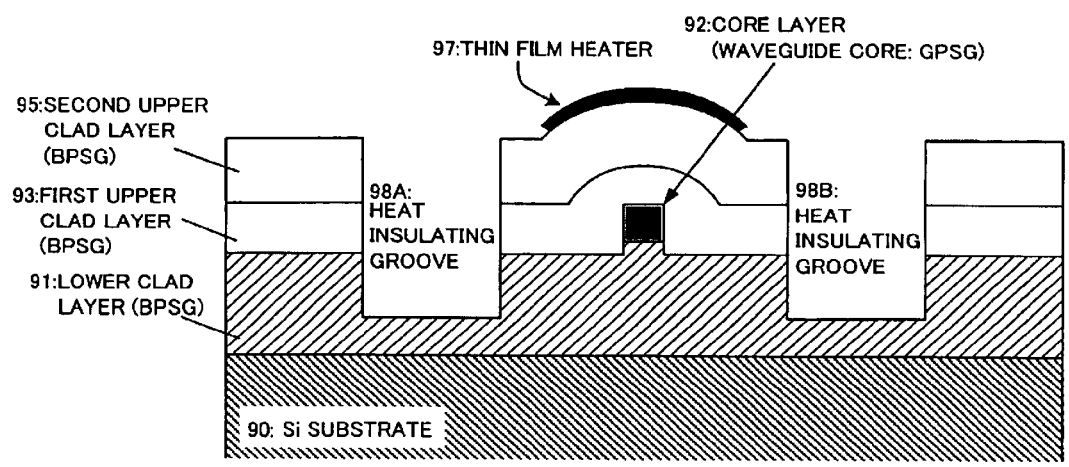
FIG. 16 is a schematic sectional view showing a general configuration of an optical waveguide device according to another modification to the seventh embodiment of the present invention.

First, the optical waveguide of the present optical waveguide device is configured such that it includes a core layer (GPSG film) 92 encircled by clad layers (BPSG films) 91, 93 and 95 formed on a substrate (Si substrate) 90 as shown in FIG. 16. In other words, the present optical waveguide is formed as a buried optical waveguide (for example, a silica glass-type buried optical waveguide, a silica glass-type optical waveguide) wherein the striped core layer (waveguide core) 92 is buried within the clad layers 91, 93 and 95.

Particularly, the upper clad layer is formed in a two-layer structure including a first upper clad layer 93 including a portion contacting with the core layer 92 (a portion in the proximity of the core layer 92) and a second upper clad layer 95 formed on the first upper clad layer 93 as shown in FIG. 16.

The optical waveguide formed in such a manner as just described has a pair of heat insulating grooves 98A and 98B formed therein for raising the thermal resistance of the core layer 92. Further, the thin film heater 97 is provided on the surface of the second upper clad layer 95 such that it extends along the core layer 92 thereby to form a phase modulator (optical waveguide device) which makes use of the thermo-optic effect (TO effect).

The heat insulating grooves 98A and 98B are formed by removing the first upper clad layer 93, second upper clad layer 95 and lower clad layer 91 such that part of the lower clad layer 91 remains. Where the heat insulating grooves 98A and 98B are formed such that part of the lower clad layer 91 remains to such a degree that the power consumption is not deteriorated so as not to expose the surface of the Si substrate 90 in this manner, a stress variation can be suppressed. Consequently, the birefringence of the optical waveguide can be further reduced, and the polarization mode dispersion (PMD) and the polarization dependent loss (PDL) can be reduced.

Further, for example, where a thin film heater and heat insulating grooves are provided on the optical waveguide of the second embodiment described hereinabove to form a phase modulator (optical waveguide device), the following heat insulating groove structure may be employed.

Figure 17:
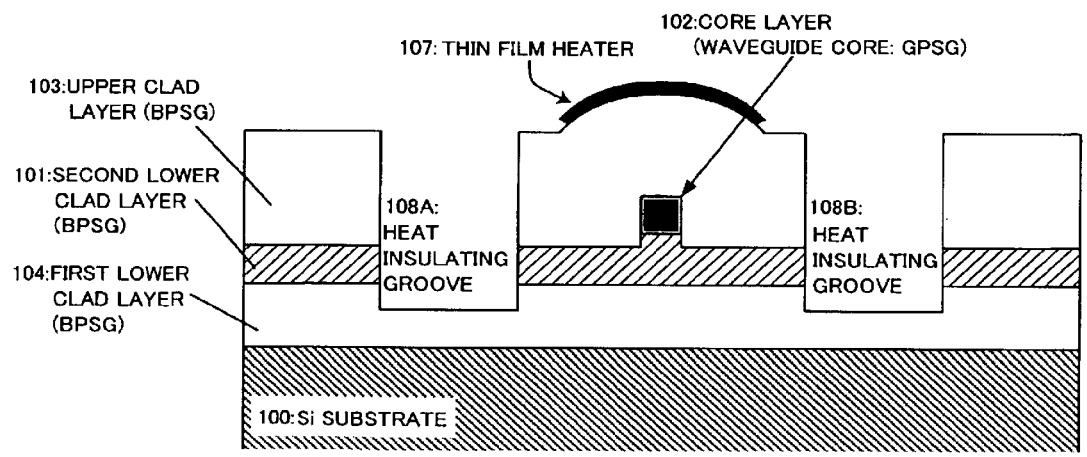
FIG. 17 is a schematic sectional view showing a general configuration of an optical waveguide device according to a further modification to the seventh embodiment of the present invention.
Figure 18:
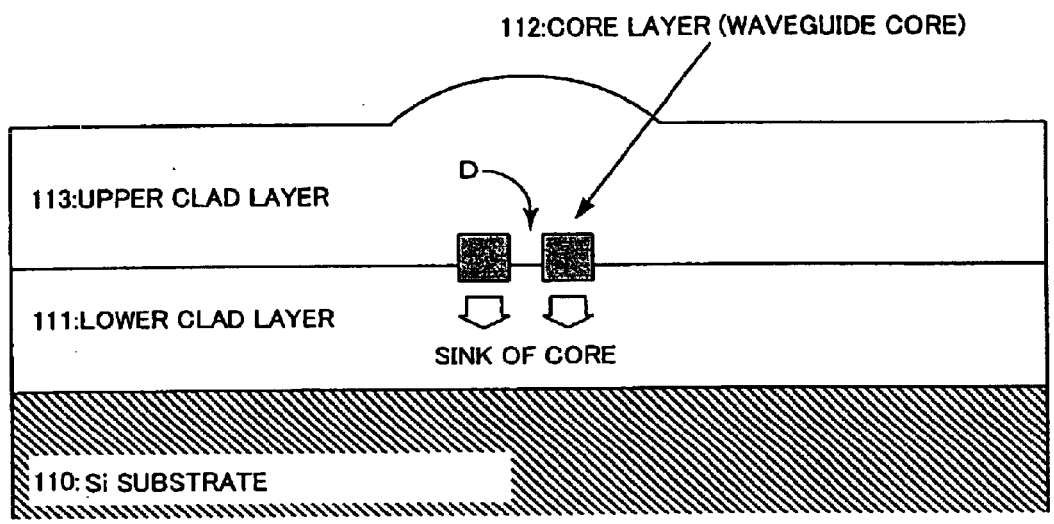
FIG. 18 is a schematic sectional view showing a general configuration of a common optical waveguide and illustrating a subject to be solved of the optical waveguide.
Figure 19:
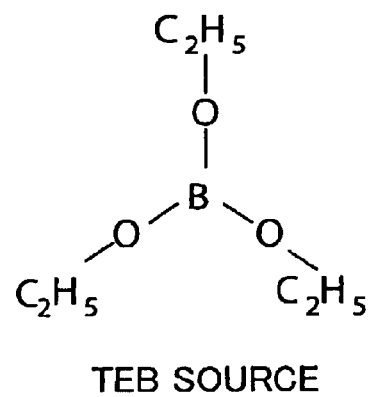
FIG. 19 is a view showing a structure of triethylborate (TEB) as an example of alkoxy-type compound used as an organic source in a common optical waveguide.
Figure 20:
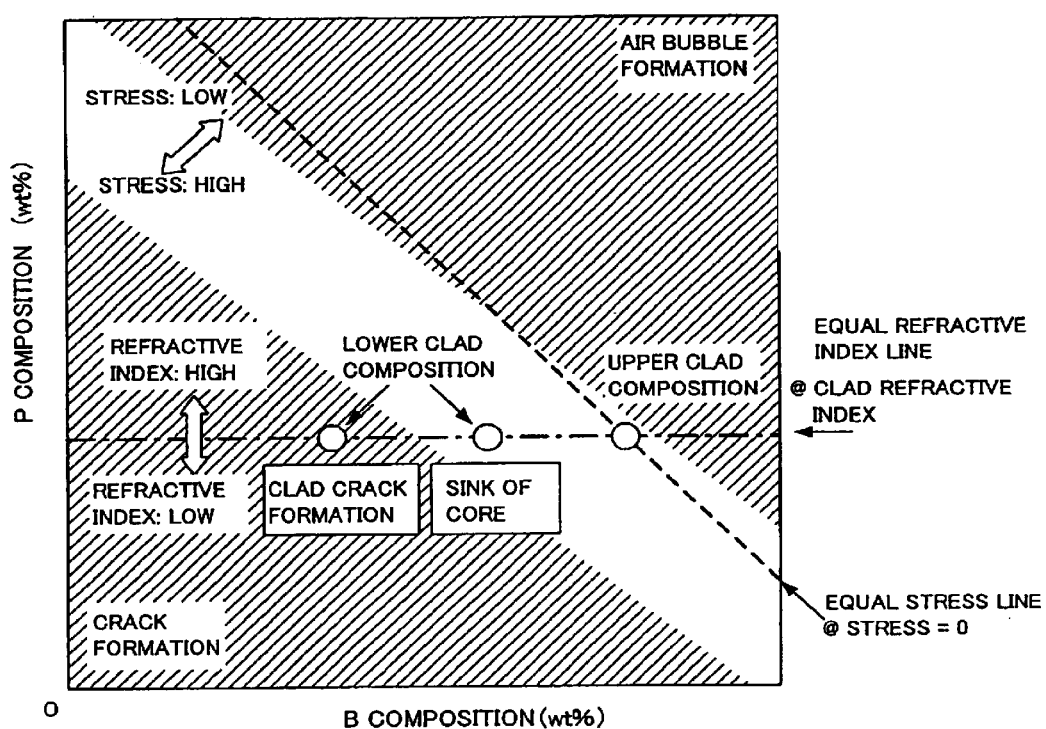
FIG. 20 is a composition chart of a trialkylsilyl-type compound used as an organic source in a common optical waveguide and illustrating a subject to be solved of the optical waveguide.

First, the optical waveguide of the present optical waveguide device is configured such that it includes a core layer (GPSG film) 102 encircled by clad layers (BPSG films) 104, 101 and 103 formed on a substrate (Si substrate) 100 as shown in FIG. 17. In other words, the present optical waveguide is formed as an buried optical waveguide (for example, a silica glass-type buried optical waveguide, a silica glass-type optical waveguide) wherein the striped core layer (waveguide core) 102 is buried within the clad layers 104, 101 and 103.

Particularly, the lower clad layer is formed in a two-layer structure including a first lower clad layer 104 which contacts with the substrate 100 and a second lower clad layer 101 including a portion contacting with the core layer 102 (a portion in the proximity of the core layer 102) as shown in FIG. 17.

The optical waveguide formed in such a manner as just described has a pair of heat insulating grooves 108A and 108B formed therein for raising the thermal resistance of the core layer 102. Further, a thin film heater 107 is provided on the surface of the upper clad layer 103 such that it extends along the core layer 102 thereby to form a phase modulator (optical waveguide device) which makes use of the thermo-optic effect (TO effect).

The heat insulating grooves 108A and 108B are formed by removing the upper clad layer 103, first lower clad layer 104 and second lower clad layer 101 such that part of the first lower clad layer 104 remains. Where the heat insulating grooves 108A and 108B are formed such that part of the first lower clad layer 104 remains to such a degree that the power consumption is not deteriorated so as not to expose the surface of the Si substrate 100 in this manner, a stress variation can be suppressed. Consequently, the birefringence of the optical waveguide can be further reduced, and the polarization mode dispersion (PMD) and the polarization dependent loss (PDL) can be reduced.

The present invention is not limited to the embodiment specifically described above, and variations and modifications can be made without departing from the scope of the present invention.

What is claimed is:

1. An optical waveguide, comprising:
   a substrate; and
   a lower clad layer, a core layer and an upper clad layer formed on said substrate such that said core layer is buried within said upper and lower clad layers;
   said lower clad layer being formed from a silica glass-type material, which is formed using a trialkylsilyl-type compound as an organic source, such that the melting temperature thereof is higher by a predetermined temperature or more than that of said upper clad layer.

2. The optical waveguide as claimed in claim 1, wherein said lower clad layer includes a first lower clad layer which contacts with said substrate and a second lower clad layer which contacts with said core layer, and said first lower clad layer has a thermal expansion coefficient substantially equal to that of said substrate while said second lower clad layer is formed from a silica glass-type material, which is formed using a trialkylsilyl-type compound as an organic source, such that the melting temperature thereof is higher by a predetermined temperature or more than that of said upper clad layer.

3. The optical waveguide as claimed in claim 1, wherein the trialkylsilyl-type compound includes at least one of Si—O—B bond, Si—O—Ge bond, Si—O—P bond, Si—O—Ti bond, and Si—O—Ta bond.

4. The optical waveguide as claimed in claim 1, wherein the organic source includes an alkoxy-type compound in addition to the trialkylsilyl-type compound.

5. The optical waveguide as claimed in claim 1, wherein said upper clad layer has a thermal expansion coefficient substantially equal to that of said substrate.

6. The optical waveguide as claimed in claim 1, wherein said upper clad layer includes a first upper clad layer which contacts with said core layer and a second clad layer formed on said first upper clad layer, and said first upper clad layer has a thermal expansion coefficient substantially equal to that of said substrate while said second upper clad layer has a thermal expansion coefficient higher than that of said substrate.

7. The optical waveguide as claimed in claim 1, wherein said core layer has a thermal expansion coefficient substantially equal to that of said substrate.

8. The optical waveguide as claimed in claim 1, wherein said substrate is a Si substrate.

9. The optical waveguide as claimed in claim 1, wherein said upper clad layer is formed from a silica glass-type material formed using a trialkylsilyl-type compound as an organic source.

10. An optical waveguide device formed using the optical waveguide as claimed in claim 1, comprising:

a thin film heater provided on said upper clad layer along said core layer; and a heat insulation groove for increasing the heat resistance of said core layer.

11. The optical waveguide device as claimed in claim 10, wherein said heat insulation groove is formed by removing said upper and lower clad layers such that said substrate is exposed.

12. The optical waveguide device as claimed in claim 10, wherein said heat insulation groove is formed by removing said upper and lower clad layers such that part of said lower clad layer remains.

13. A fabrication method for an optical waveguide formed on a substrate such that a core layer is buried between an upper clad layer and a lower clad layer, comprising:

a lower clad layer forming step of forming the lower clad layer from a silica glass-type material, which is formed using a trialkylsilyl-type compound as an organic source, on the substrate such that the melting temperature thereof is higher by a predetermined temperature or more than that of said upper clad layer;

a core layer forming step of forming the core layer on said lower clad layer;

a waveguide core forming step of forming a waveguide core having a desired pattern by patterning said core layer; and an upper clad layer forming step of forming the upper clad layer so as to bury said waveguide core formed on said lower clad layer.

14. The fabrication method for an optical waveguide as claimed in claim 13, wherein the lower clad layer forming step includes the steps of:

forming a first lower clad layer having a thermal expansion coefficient substantially equal to that of said substrate on the substrate; and forming a second lower clad layer from a silica glass-type material, which is formed using a trialkylsilyl-type compound as an organic source, on said first lower clad layer such that the melting temperature thereof is higher by a predetermined temperature or more than that of said upper clad layer.

15. The fabrication method for an optical waveguide as claimed in claim 13, wherein the upper clad layer forming step includes the steps of:

forming a first upper clad layer having a thermal expansion coefficient substantially equal to that of said substrate such so as to surround said waveguide core formed on said lower clad layer; and forming a second upper clad layer having a thermal expansion coefficient higher than that of said substrate on said first upper clad layer.

16. The fabrication method for an optical waveguide as claimed in claim 13, wherein an atmospheric pressure CVD method is used for forming said lower clad layer, core layer and upper clad layer at the lower clad layer forming step, core layer forming step and upper clad layer forming step, respectively.

* * * * *